United States Patent
Sasaki et al.

(10) Patent No.: US 9,208,806 B2
(45) Date of Patent: Dec. 8, 2015

(54) NEAR-FIELD LIGHT GENERATOR INCLUDING A WAVEGUIDE AND A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Hideo Mamiya, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Hideo Mamiya, Milpitas, CA (US); Ryuji Fujii, Hong Kong (CN)

(73) Assignees: HEADWAY TECHNOLOGIES, INC., Milpitas, CA (US); SAE MAGNETICS (H.K.) LTD., Hong Kong (CN)

(*) Notice: Subject to any disclaimer, the term of this patent is extended or adjusted under 35 U.S.C. 154(b) by 64 days.

(21) Appl. No.: 14/203,018

(22) Filed: Mar. 10, 2014

(65) Prior Publication Data
US 2015/0255096 A1  Sep. 10, 2015

(51) Int. Cl.
*G11B 5/127* (2006.01)
*G11B 5/48* (2006.01)
*G11B 5/00* (2006.01)

(52) U.S. Cl.
CPC ............ *G11B 5/4866* (2013.01); *G11B 5/127* (2013.01); *G11B 2005/0021* (2013.01)

(58) Field of Classification Search
CPC ......... G11C 2005/0021; G11C 5/314; G11C 5/6088; G11C 5/3116; G11C 5/127; G11C 5/4866; G02B 6/1226; G02B 6/107

USPC .................. 360/125.31; 369/13.33, 13.13
See application file for complete search history.

(56) References Cited

U.S. PATENT DOCUMENTS

| | | | | |
|---|---|---|---|---|
| 8,077,558 B1* | 12/2011 | Tsutsumi | ............... | B82Y 20/00 369/112.27 |
| 8,477,454 B2* | 7/2013 | Zou | ................. | G11B 5/314 360/125.31 |
| 8,509,038 B1* | 8/2013 | Sasaki | ................. | G11B 5/314 369/13.13 |
| 8,576,674 B2* | 11/2013 | Sasaki | ................. | G11B 5/314 369/112.27 |
| 8,675,457 B1* | 3/2014 | Hirata | ................. | G11B 5/314 369/13.33 |
| 8,830,799 B1* | 9/2014 | Sasaki | ................. | G02B 5/008 369/13.33 |
| 8,867,170 B1* | 10/2014 | Sasaki | ................. | G11B 5/314 360/125.3 |
| 8,900,466 B2* | 12/2014 | Araki | ................. | G11B 5/314 216/22 |
| 2014/0269237 A1* | 9/2014 | Sasaki | ................. | B23K 10/00 369/13.24 |
| 2015/0124575 A1* | 5/2015 | Sasaki | ................. | G11B 5/4866 369/13.33 |

* cited by examiner

*Primary Examiner* — Will J Klimowicz
(74) *Attorney, Agent, or Firm* — Oliff PLC

(57) ABSTRACT

A plasmon generator includes a first portion and a second portion. A core of a waveguide includes a main body portion and a protruding portion. The main body portion has a first surface and a second surface parallel to each other. The protruding portion lies on the first surface. A cladding of the waveguide includes a receiving-portion-forming layer lying on the first surface. At least part of the first portion of the plasmon generator is received in a receiving portion defined by the protruding portion and the receiving-portion-forming layer.

14 Claims, 15 Drawing Sheets

NEAR-FIELD LIGHT GENERATOR INCLUDING A WAVEGUIDE AND A PLASMON GENERATOR

BACKGROUND OF THE INVENTION

1. Field of the Invention

The present invention relates to a near-field light generator for use in thermally-assisted magnetic recording in which data is written on a recording medium with its coercivity lowered by irradiating the recording medium with near-field light, and to a thermally-assisted magnetic recording head including the near-field light generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface to face the recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, whereby the area is made to increase in temperature and drop in coercivity, and data is written thereon. The area where data is written subsequently falls in temperature and rises in coercivity to increase in thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider. The waveguide includes a core through which light propagates, and a cladding provided around the core.

The plasmon generator has a front end face located in the medium facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2010/0172220 A1 discloses a near-field light generator including a waveguide and a plasmon generator. In the near-field light generator, the plasmon generator is disposed at a predetermined distance from the core of the waveguide. In the near-field light generator, evanescent light is generated at the surface of the core and surface plasmons are excited on the surface of the plasmon generator through coupling with the evanescent light.

Materials that are typically employed for plasmon generators are metals having high electrical conductivities, such as Au and Ag. However, Au and Ag are relatively soft and have relatively high thermal expansion coefficients. Thus, forming an entire plasmon generator of Au or Ag gives rise to problems as discussed below.

In the process of manufacturing a thermally-assisted magnetic recording head, the medium facing surface is formed by polishing. During polishing, polishing residues of metal materials may grow to cause smears. To remove the smears, the polished surface is slightly etched by, for example, ion beam etching in some cases. If an entire plasmon generator is formed of Au or Ag, which is relatively soft, the polishing and etching mentioned above may cause the front end face of the plasmon generator to be significantly recessed relative to the other parts of the medium facing surface. In such a case, the front end face of the plasmon generator becomes distant from the recording medium, and the heating performance of the plasmon generator is thus degraded.

Part of the energy of light propagating through the core is transformed into heat in the plasmon generator. Part of the energy of near-field light generated by the plasmon generator is also transformed into heat in the plasmon generator. The plasmon generator thus rises in temperature during the operation of the thermally-assisted magnetic recording head. If the entire plasmon generator is formed of Au or Ag, the rise in temperature of the plasmon generator causes the plasmon generator to expand and significantly protrude toward the recording medium. This in turn may cause a protective film covering the medium facing surface to come into contact with the recording medium and thereby damage the recording medium or be broken. When the protective film is broken, the plasmon generator may be damaged by contact with the recording medium or may be corroded by contact with high temperature air.

Further, if the entire plasmon generator is formed of Au or Ag, the temperature rise of the plasmon generator may result in deformation of the plasmon generator due to aggregation. In addition, such a plasmon generator expands when its temperature rises and then contracts when its temperature drops. When the plasmon generator undergoes such a process, the front end face of the plasmon generator may be significantly recessed relative to the other parts of the medium facing surface. In such a case, the heating performance of the plasmon generator is degraded as mentioned above.

For the various reasons described above, a plasmon generator that is formed entirely of Au or Ag has the drawback of being low in reliability. The drawback becomes more noticeable if the front end face of the plasmon generator is large in area.

U.S. Patent Application Publication No. 2010/0172220 A1 discloses a plasmon generator shaped such that the thickness of a portion of the plasmon generator near the front end face decreases toward the front end face. This plasmon generator allows for a reduction in the area of the front end face. U.S. Patent Application Publication No. 2010/0172220 A1 further discloses a structure in which the plasmon generator has a propagation edge or a propagation surface to allow surface plasmons to propagate therethrough, and a groove for receiving at least a portion of the propagation edge or the propagation surface is formed in a top surface of the core having the top surface and a bottom surface. This structure aims at exciting a lot of surface plasmons on the propagation edge or the propagation surface.

The above-described structure, however, has a drawback that the efficiency of excitation of surface plasmons on the plasmon generator suffers a reduction due to the groove. This will now be described in detail. To begin with, we will consider a first cross section which passes through an edge of the groove closest to the light-incidence end of the core and is perpendicular to the direction of travel of the light propagating through the core. Then, a portion of the core that is located closer to the light-incidence end relative to the first cross section will be referred to as the first portion, and another portion of the core that is located farther from the light-incidence end relative to the first cross section will be referred to as the second portion.

Next, we will consider a second cross section which is parallel to the direction of travel of the light propagating through the core and perpendicular to the bottom surface of the core. On the second cross section, the dimension of the core in a direction perpendicular to the bottom surface of the core is defined as thickness. The first portion does not include the groove, whereas the second portion includes the groove. Consequently, the second portion is smaller in thickness than the first portion. Further, the center of the second portion in the thickness direction does not coincide with the center of the first portion in the thickness direction.

Next, we will consider a typical core having no groove and having a constant thickness. When such a typical core is used to excite surface plasmons on the plasmon generator, the greatest efficiency of propagation of light through the core and the greatest efficiency of excitation of surface plasmons on the plasmon generator are achieved when the optical axis of the light incident on the core coincides with the center of the core in the thickness direction.

To allow light to enter the first portion of the core having the groove, the optical axis of the light is typically aligned with the center of the first portion in the thickness direction. This is for the purpose of achieving the greatest efficiency of propagation of the light through the first portion. The light having entered the first portion propagates through the first portion and enters the second portion. As mentioned above, the center of the second portion in the thickness direction does not coincide with the center of the first portion in the thickness direction. Consequently, when the light enters the second portion, its optical axis does not coincide with the center of the second portion in the thickness direction. This results in a reduced efficiency of propagation of the light through the second portion. As a result, the efficiency of excitation of surface plasmons on the plasmon generator is also reduced.

OBJECT AND SUMMARY OF THE INVENTION

It is an object of the present invention to provide a near-field light generator including a waveguide and a plasmon generator, the near-field light generator allowing a lot of surface plasmons to be excited on the plasmon generator and allowing the plasmon generator to operate with high reliability, and to provide a thermally-assisted magnetic recording head including such a near-field light generator.

A thermally-assisted magnetic recording head of the present invention includes a medium facing surface configured to face a recording medium, a main pole configured to produce a write magnetic field for writing data on the recording medium, and a near-field light generator of the present invention. The near-field light generator of the present invention includes a waveguide and a plasmon generator. The waveguide includes a core through which light propagates, and a cladding provided around the core.

The core has a first front end face lying at an end of the core in a first direction, the first direction being the direction of travel of the light propagating through the core. The plasmon generator has a second front end face lying at an end of the plasmon generator in the first direction. In the thermally-assisted magnetic recording head of the present invention, the second front end face is located in the medium facing surface.

The core and the plasmon generator are adjacent in a second direction orthogonal to the first direction. The plasmon generator includes a first portion and a second portion adjacent in the second direction. The second portion includes the second front end face.

The core includes a main body portion and a protruding portion adjacent in the second direction. The main body portion has a first surface facing toward the plasmon generator, and a second surface opposite to the first surface. The first and second surfaces are flat surfaces parallel to each other. The first surface includes a first region, a second region and a third region. The first region has an edge located in the first front end face. The second region is contiguous with the first region and is located farther from the first front end face than is the first region. The third region is a region of the first surface other than the first and second regions.

The protruding portion lies on the first region, and has a first end face constituting part of the first front end face, and a second end face opposite to the first end face. The cladding includes a receiving-portion-forming layer lying on the third region. The protruding portion and the receiving-portion-forming layer define therebetween a receiving portion. At least part of the first portion of the plasmon generator is received in the receiving portion.

The first portion of the plasmon generator includes a first plasmon exciting portion opposed to the second region, and a second plasmon exciting portion opposed to the second end face of the protruding portion. The second region generates first evanescent light based on the light propagating through the core. The second end face of the protruding portion generates second evanescent light based on the light propagating through the core.

In the near-field light generator and the thermally-assisted magnetic recording head of the present invention, the plasmon generator is configured so that a first surface plasmon is excited on the first plasmon exciting portion through coupling with the first evanescent light, and a second surface plasmon is excited on the second plasmon exciting portion through coupling with the second evanescent light. The second front end face of the plasmon generator generates near-field light based on the first and second surface plasmons.

In the near-field light generator and the thermally-assisted magnetic recording head of the present invention, the second end face of the protruding portion may have a first edge in contact with the first surface of the main body portion, and a second edge farthest from the first surface. The second edge may be located closer to the first front end face of the core than is the first edge. The second plasmon exciting portion may have a third edge in contact with the first plasmon exciting portion, and a fourth edge in contact with the second portion of the plasmon generator. The fourth edge may be located closer to the first front end face of the core than is the third edge.

In the near-field light generator and the thermally-assisted magnetic recording head of the present invention, the second portion of the plasmon generator may include a first metal layer, a second metal layer, and an intermediate layer. The intermediate layer is interposed between the first metal layer and the second metal layer. Each of the first metal layer, the second metal layer and the intermediate layer has an end located in the second front end face. Each of the first and second metal layers is formed of a metal material. The intermediate layer is formed of a material that is higher in Vickers hardness than the metal material used to form the first metal layer and the metal material used to form the second metal layer.

A method of manufacturing the near-field light generator of the present invention includes the steps of forming the core; forming the cladding; and forming the plasmon generator after the step of forming the core.

In the method of manufacturing the near-field light generator of the present invention, the step of forming the core may include the step of forming the main body portion and the step of forming the protruding portion on the first region of the first surface of the main body portion. In this case, the second end face of the protruding portion has a first edge in contact with the first surface of the main body portion, and a second edge farthest from the first surface. The second edge may be located closer to the first front end face of the core than is the first edge. The second plasmon exciting portion may have a third edge in contact with the first plasmon exciting portion, and a fourth edge in contact with the second portion of the plasmon generator. The fourth edge may be located closer to the first front end face of the core than is the third edge. The step of forming the protruding portion may include the step of forming an initial protruding portion on the first region of the first surface of the main body portion, and the step of taper-etching the initial protruding portion so that the initial protruding portion is provided with the second end face and thereby becomes the protruding portion.

In the method of manufacturing the near-field light generator of the present invention, the step of forming the core may include the step of forming an initial core having a top surface, and the step of partly etching the top surface of the initial core so that the initial core becomes the core. In this case, the second end face of the protruding portion has a first edge in contact with the first surface of the main body portion, and a second edge farthest from the first surface. The second edge may be located closer to the first front end face of the core than is the first edge. The second plasmon exciting portion may have a third edge in contact with the first plasmon exciting portion, and a fourth edge in contact with the second portion of the plasmon generator. The fourth edge may be located closer to the first front end face of the core than is the third edge.

In the method of manufacturing the near-field light generator of the present invention, the step of forming the cladding may include the step of forming the receiving-portion-forming layer before the step of forming the plasmon generator. Alternatively, the step of forming the plasmon generator may include the step of forming the first portion and the step of forming the second portion. The step of forming the cladding may include the step of forming the receiving-portion-forming layer that is performed simultaneously with the step of forming the first portion.

In the present invention, the plasmon generator includes the first portion and the second portion. The second portion includes the second front end face. The first portion includes the first plasmon exciting portion and the second plasmon exciting portion. These features make it possible to reduce the area of the second front end face and thereby enhance the reliability of the plasmon generator.

Further, in the present invention, the first and second surfaces of the main body portion of the core are flat surfaces parallel to each other, and the first surface includes the second region to generate the first evanescent light. Consequently, in the course of travel of the light propagating through the main body portion of the core to reach the second region, there is no reduction in efficiency of propagation of the light. This makes it possible to excite a lot of first surface plasmons on the first plasmon exciting portion.

Further, the present invention allows the second evanescent light to be generated from the second end face of the protruding portion of the core, and thereby allows the second surface plasmon to be excited on the second plasmon exciting portion of the plasmon generator.

Consequently, the present invention makes it possible to provide a near-field light generator that allows a lot of surface plasmons to be excited on a plasmon generator and allows the plasmon generator to operate with high reliability, and to provide a thermally-assisted magnetic recording head including such a near-field light generator.

Other and further objects, features and advantages of the present invention will appear more fully from the following description.

DETAILED DESCRIPTION OF THE PREFERRED EMBODIMENTS

[First Embodiment]

Figure 5:
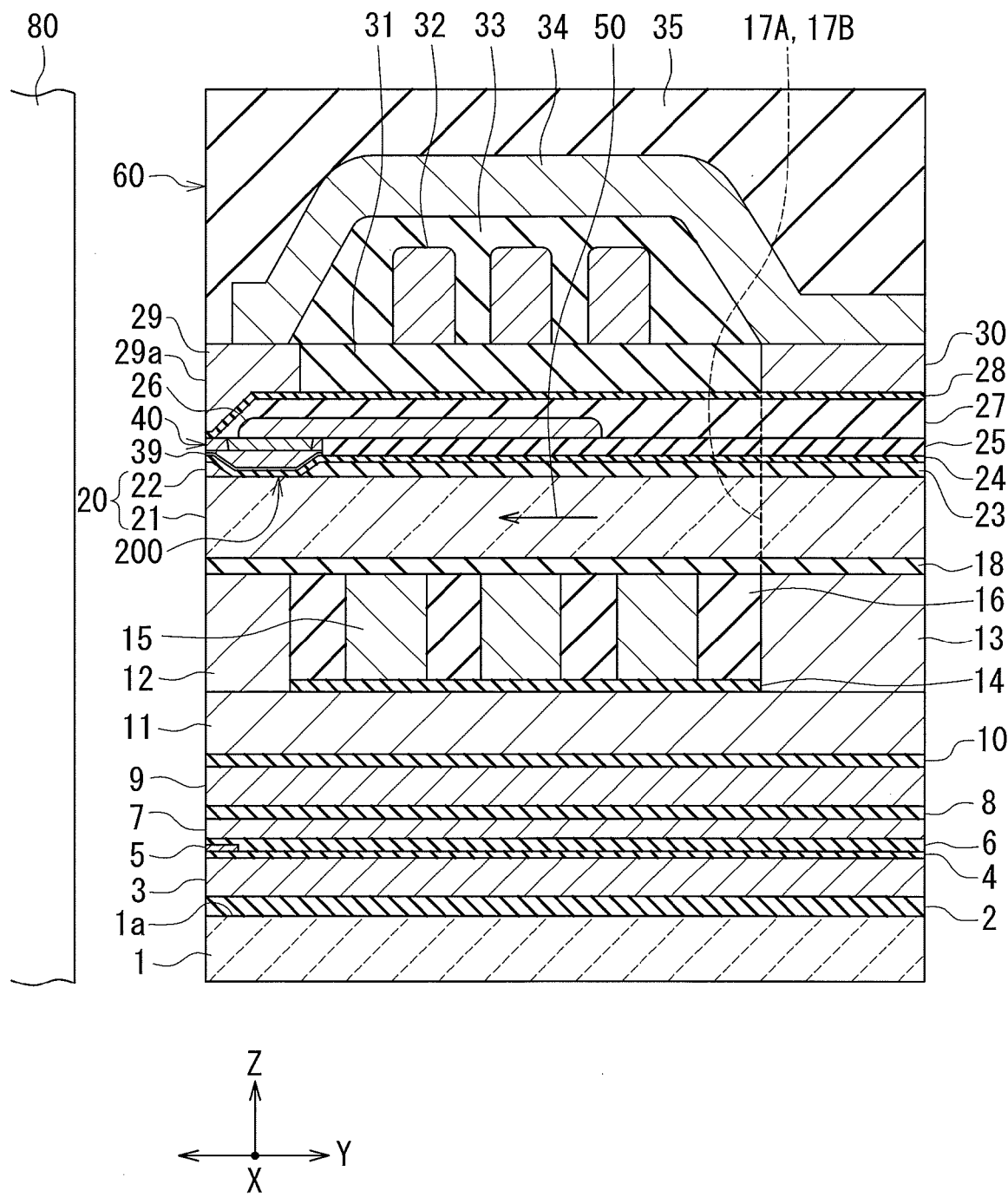
FIG. 5 is a cross-sectional view showing the configuration of the thermally-assisted magnetic recording head according to the first embodiment of the invention.
Figure 6:
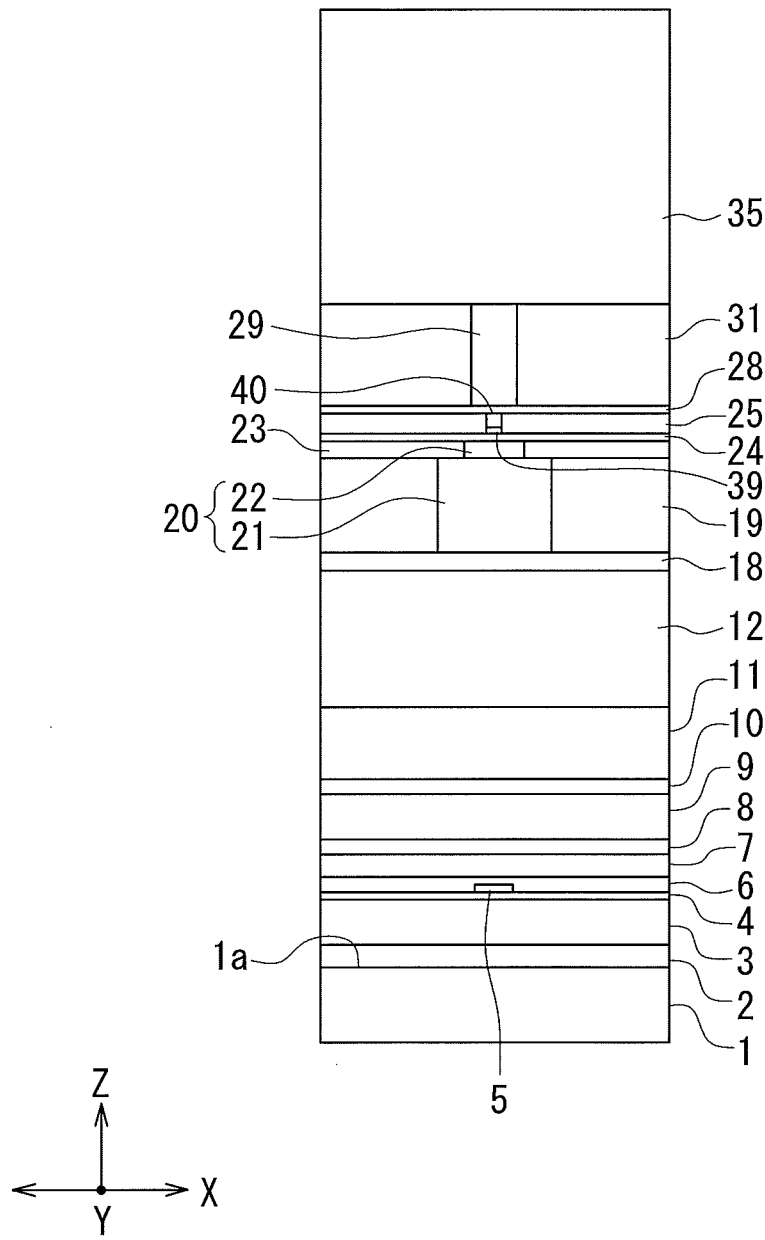
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is intended for perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 60 configured to face a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes: an insulating layer 8 disposed on the top shield layer 7; a middle shield layer 9 formed of a magnetic material and disposed on the insulating layer 8; and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a return pole layer 11 formed of a magnetic material and disposed on the nonmagnetic layer 10, and an insulating layer (not illustrated) disposed on the nonmagnetic layer 10 and surrounding the return pole layer 11. The return pole layer 11 has an end face located in the medium facing surface 60. The non-illustrated insulating layer is formed of alumina, for example.

The thermally-assisted magnetic recording head further includes: a shield layer 12 located near the medium facing surface 60 and lying on a portion of the return pole layer 11; a coupling layer 13 located away from the medium facing surface 60 and lying on another portion of the return pole layer 11; an insulating layer 14 lying on the remaining portion of the return pole layer 11 and on the non-illustrated insulating layer; and a coil 15 lying on the insulating layer 14. The shield layer 12 and the coupling layer 13 are each formed of a magnetic material. The shield layer 12 has an end face located in the medium facing surface 60. The coil 15 is planar spiral-shaped and wound around the coupling layer 13. The coil 15 is formed of a conductive material such as copper. The insulating layer 14 is formed of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each formed of a magnetic material. Each of the coupling portions 17A and 17B includes a first layer located on the coupling layer 13, and a second and a third layer stacked in this order on the first layer. The first layer of the coupling portion 17A and the first layer of the coupling portion 17B are aligned in the track width direction (the X direction). The insulating layer 16 is formed of alumina, for example.

The thermally-assisted magnetic recording head further includes a waveguide, the waveguide including a core 20 through which light propagates, and a cladding provided around the core 20. The core 20 will be described in detail later.

The cladding includes cladding layers 18, 19 and 24, and a receiving-portion-forming layer 23. The cladding layer 18 lies on the shield layer 12, the coupling layer 13, the coil 15 and the insulating layer 16. The core 20 lies on the cladding layer 18. The cladding layer 19 lies on the cladding layer 18 and surrounds the core 20. The receiving-portion-forming layer 23 lies on the cladding layer 19 and a portion of the core 20. The cladding layer 24 lies on another portion of the core 20 and the receiving-portion-forming layer 23.

The core 20 is formed of a dielectric material that transmits laser light to be used for generating near-field light. The laser light emitted from a laser diode (not illustrated) enters the core 20 and propagates through the core 20. The cladding layers 18, 19 and 24 and the receiving-portion-forming layer 23 are each formed of a dielectric material that has a refractive index lower than that of the core 20. For example, the core 20 may be formed of tantalum oxide such as $Ta_2O_5$ or silicon oxynitride (SiON), while the cladding layers 18, 19 and 24 and the receiving-portion-forming layer 23 may be formed of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction), and are each at a distance from the core 20.

The thermally-assisted magnetic recording head further includes: a main pole 29 located near the medium facing surface 60 and lying above the core 20; a plasmon generator 40 located between the core 20 and the main pole 29; and an adhesion layer 39 interposed between the cladding layer 24 and the plasmon generator 40. The plasmon generator 40 is configured to excite surface plasmons on the principle to be described later. The adhesion layer 39 is to prevent the plasmon generator 40 from peeling away from the cladding layer 24. The adhesion layer 39 may be formed of one of Zr, ZrN, Ru, Pt, Pd, Ti, Ta, Ni, W, Cr, NiCr, NiFe, Co, Cu, TiW, TiN, Mo, Hf, and Rh, for example. The adhesion layer 39 may have a thickness of 0.3 to 1 nm, for example. The adhesion layer 39 is not an essential component of the thermally-assisted magnetic recording head, and can be dispensed with. The plasmon generator 40 will be described in detail later.

The main pole 29 has an end face 29a located in the medium facing surface 60. The main pole 29 may include a narrow portion having the end face 29a and an end opposite to the end face 29a, and a wide portion connected to the end of the narrow portion. The wide portion is greater than the narrow portion in width in the track width direction (the X direction).

The thermally-assisted magnetic recording head further includes: a dielectric layer 25 lying on the cladding layer 24 and surrounding the plasmon generator 40; a heat sink 26 lying astride part of the plasmon generator 40 and part of the dielectric layer 25; a dielectric layer 27 disposed to cover the heat sink 26; and a dielectric layer 28 disposed to cover the plasmon generator 40 and the dielectric layer 27. The heat sink 26 has a maximum thickness in the range of 200 to 500 nm, for example. The dielectric layer 27 has a top surface, and an end face closest to the medium facing surface 60. The distance from the medium facing surface 60 to an arbitrary point on the aforementioned end face of the dielectric layer 27 decreases with decreasing distance from the arbitrary point to the top surface 1a of the substrate 1. The dielectric layer 27 has a maximum thickness in the range of 200 to 800 nm, for example.

The main pole 29 is disposed on the dielectric layer 28 so as to lie above part of each of the top surface of the plasmon generator 40, the end face of the dielectric layer 27 and the top surface of the dielectric layer 27. The dielectric layer 28 has a thickness in the range of, for example, 10 to 40 nm, preferably in the range of 15 to 25 nm.

The third layers of the coupling portions 17A and 17B are embedded in the receiving-portion-forming layer 23, the cladding layer 24 and the dielectric layers 25, 27 and 28. The dielectric layers 25, 27 and 28 may be formed of $SiO_2$ or alumina, for example. The heat sink 26 is formed of a material having a high thermal conductivity, such as Au, Ag, Al, or Cu. The heat sink 26 has the function of dissipating heat generated at the plasmon generator 40. The heat sink 26 is not an essential component of the thermally-assisted magnetic recording head, and can be dispensed with.

The thermally-assisted magnetic recording head further includes a coupling layer 30 formed of a magnetic material and disposed over the third layers of the coupling portions 17A and 17B and the dielectric layer 28, and a dielectric layer 31 disposed around the main pole 29 and the coupling layer 30. The top surfaces of the main pole 29, the coupling layer 30 and the dielectric layer 31 are even with each other. The dielectric layer 31 is formed of $SiO_2$ or alumina, for example.

The thermally-assisted magnetic recording head further includes a coil 32 disposed on the dielectric layer 31, an insulating layer 33 disposed to cover the coil 32, and a yoke layer 34 formed of a magnetic material and disposed over the main pole 29, the coupling layer 30 and the insulating layer 33. The yoke layer 34 magnetically couples the main pole 29 and the coupling layer 30 to each other. The coil 32 is planar spiral-shaped and wound around a portion of the yoke layer 34 that lies on the coupling layer 30. The coil 32 is formed of a conductive material such as copper. The insulating layer 33 is formed of alumina, for example.

The thermally-assisted magnetic recording head further includes a protective layer 35 disposed to cover the yoke layer 34. The protective layer 35 is formed of alumina, for example.

The parts from the return pole layer 11 to the yoke layer 34 constitute a write head unit. The coils 15 and 32 produce magnetic fields corresponding to data to be written on the recording medium 80. The shield layer 12, the return pole layer 11, the coupling layer 13, the coupling portions 17A and 17B, the coupling layer 30, the yoke layer 34, and the main pole 29 form a magnetic path for passing magnetic fluxes corresponding to the magnetic fields produced by the coils 15 and 32. The coils 15 and 32 are connected in series or in parallel so that the magnetic flux corresponding to the magnetic field produced by the coil 15 and the magnetic flux corresponding to the magnetic field produced by the coil 32 flow in the same direction through the main pole 29. The main pole 29 allows the magnetic flux corresponding to the magnetic field produced by the coil 15 and the magnetic flux corresponding to the magnetic field produced by the coil 32 to pass, and produces a write magnetic field for writing data on the recording medium 80 by means of a perpendicular magnetic recording system.

The coil 15 is not an essential component of the thermally-assisted magnetic recording head, and can be dispensed with. The coil 32 may be wound helically around the yoke layer 34.

As has been described, the thermally-assisted magnetic recording head according to the present embodiment includes the medium facing surface 60, the read head unit, and the write head unit. The read head unit and the write head unit are stacked on the substrate 1. The write head unit is located on the trailing side, i.e., the front side in the direction of travel of the recording medium 80 (the Z direction) relative to the read head unit.

The thermally-assisted magnetic recording head may include a protective film covering the medium facing surface 60. The protective film may be formed of diamond-like-carbon (DLC) or $Ta_2O_5$, for example. The protective film is not an essential component of the thermally-assisted magnetic recording head and can be dispensed with.

The write head unit includes the coils 15 and 32, the main pole 29, and a near-field light generator according to the present embodiment. The near-field light generator includes the waveguide and the plasmon generator 40. The waveguide includes the core 20 and the cladding. The cladding includes the cladding layers 18, 19 and 24 and the receiving-portion-forming layer 23. The main pole 29 is located on the front side in the direction of travel of the recording medium 80 (the Z direction) relative to the core 20. The plasmon generator 40 is located between the core 20 and the main pole 29.

Figure 1:
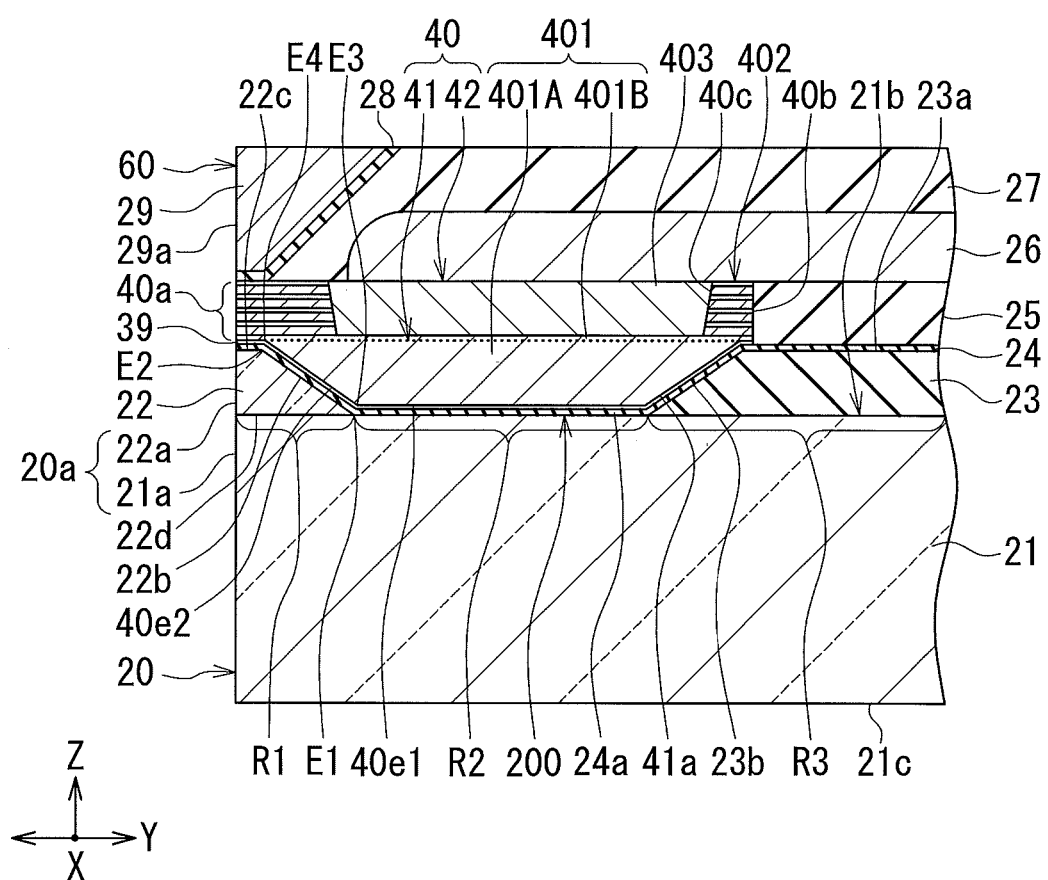
FIG. 1 is a cross-sectional view showing the main part of a thermally-assisted magnetic recording head according to a first embodiment of the invention.
Figure 2:
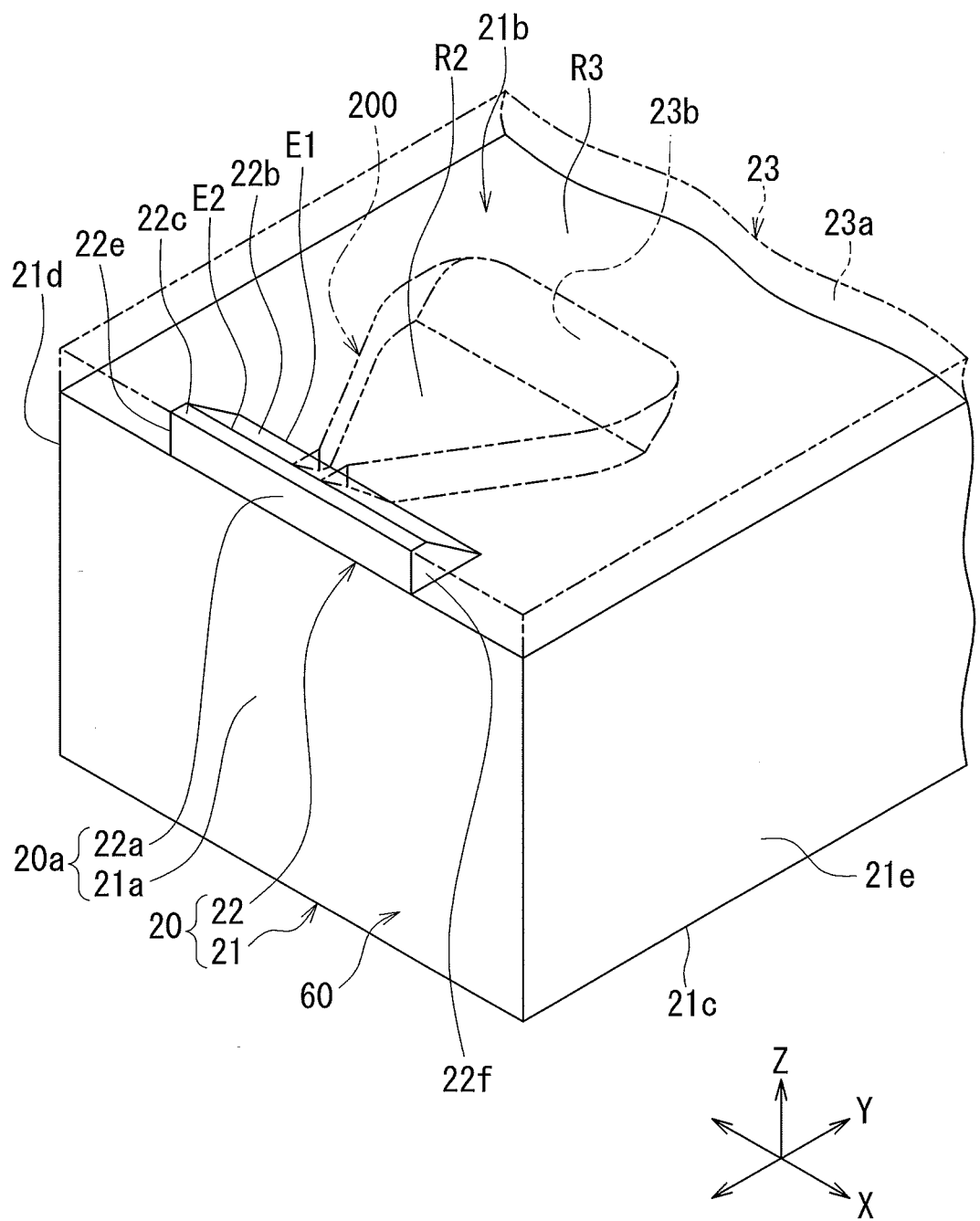
FIG. 2 is a perspective view of the core of the waveguide shown in FIG. 1.
Figure 3:
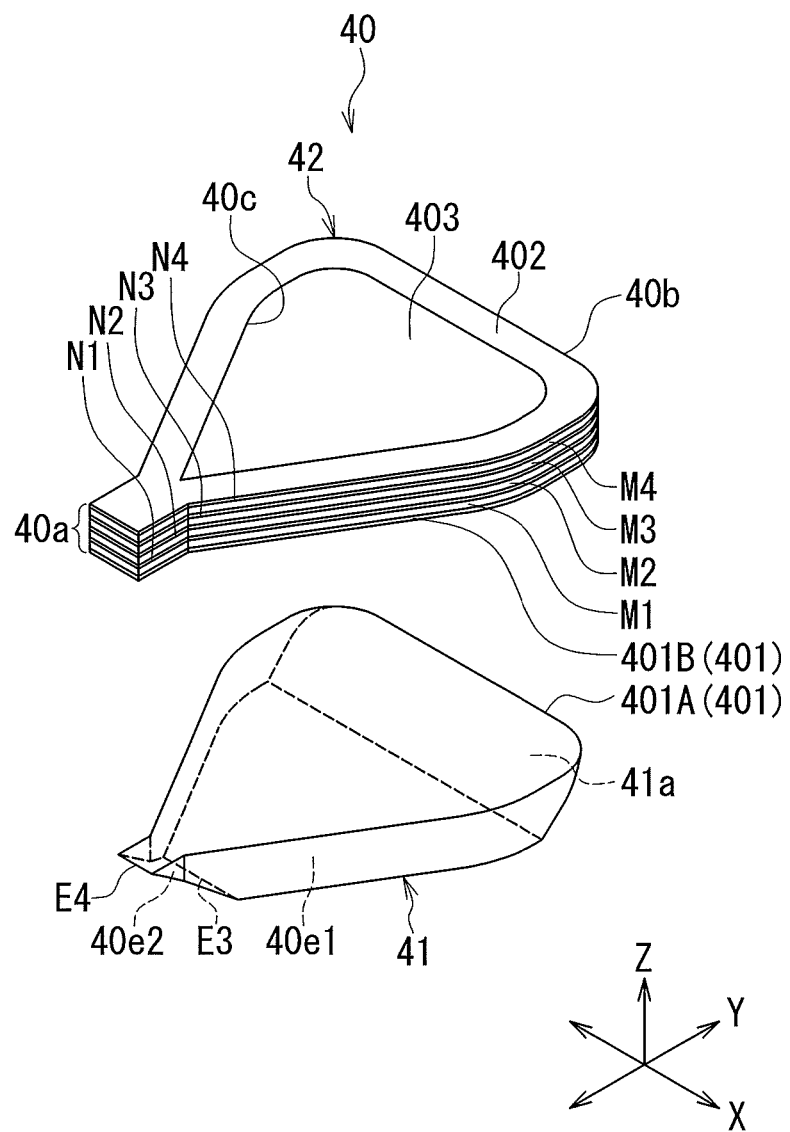
FIG. 3 is a perspective view of the plasmon generator shown in FIG. 1.
Figure 4:
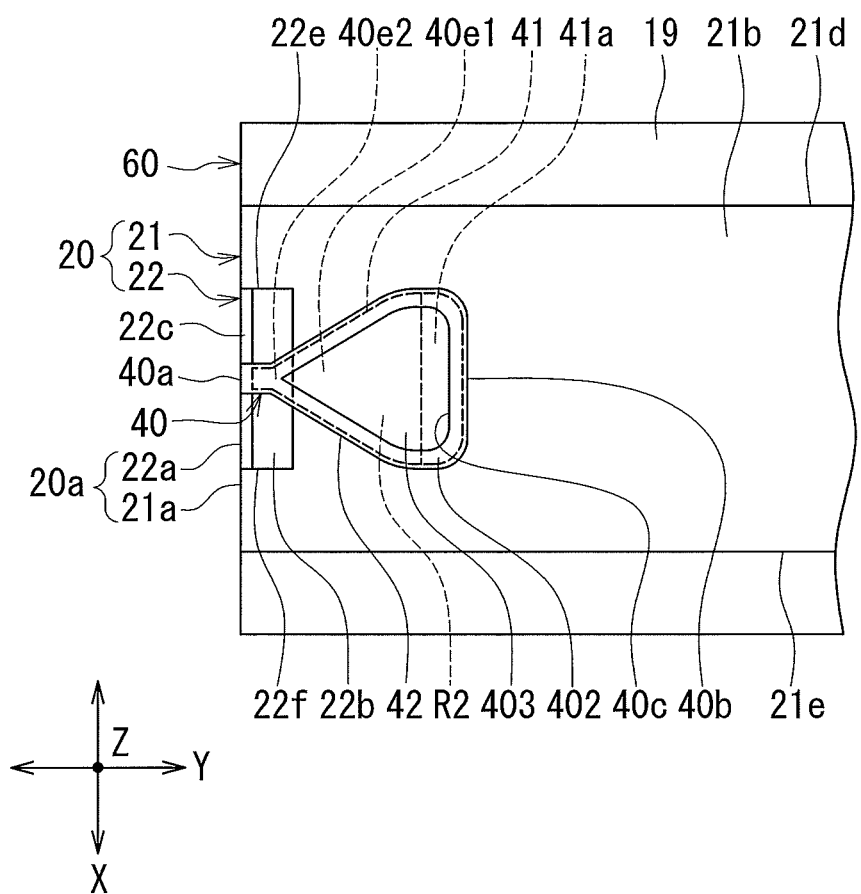
FIG. 4 is a plan view showing the positional relationship between the plasmon generator and the core of the waveguide shown in FIG. 1.

The core 20 and the plasmon generator 40 will now be described in detail with reference to FIG. 1 to FIG. 5. FIG. 1 is a cross-sectional view showing the main part of the thermally-assisted magnetic recording head according to the present embodiment. FIG. 2 is a perspective view of the core 20 shown in FIG. 1. FIG. 3 is a perspective view of the plasmon generator 40 shown in FIG. 1. FIG. 4 is a plan view showing the positional relationship between the plasmon generator 40 and the core 20 of the waveguide shown in FIG. 1.

As shown in FIG. 5, the core 20 extends in a direction perpendicular to the medium facing surface 60 (the Y direction). In FIG. 5, the arrow labeled 50 indicates the direction of travel of laser light 50 propagating through the core 20. The direction of travel of the laser light 50 is parallel to the Y direction and toward the medium facing surface 60. The direction of travel of the laser light 50 (the Y direction) corresponds to the "first direction" in the present invention. As shown in FIG. 1, FIG. 2 and FIG. 4, the core 20 has a first front end face 20a lying at an end of the core 20 in the direction of travel of the laser light 50 (the first direction). In the present embodiment, the first front end face 20a is located in the medium facing surface 60.

The Z direction corresponds to the "second direction" in the present invention, and is orthogonal to the direction of travel of the laser light 50 (the first direction). The core 20 and the plasmon generator 40 are adjacent in the Z direction (the second direction). In the present embodiment, the plasmon generator 40 is located on the front side in the Z direction (the second direction) relative to the core 20.

The core 20 includes a main body portion 21 and a protruding portion 22 adjacent in the Z direction (the second direction). As shown in FIG. 1, FIG. 2 and FIG. 4, the main body portion 21 has: an end face 21a constituting part of the first front end face 20a; a first surface 21b which is a top surface facing toward the plasmon generator 40; a second surface 21c opposite to the first surface 21b; two side surfaces 21d and 21e; and an incidence end (not illustrated). The first and second surfaces 21b and 21c are flat surfaces parallel to each other. Both of the first and second surfaces 21b and 21c are perpendicular to the Z direction (the second direction), or equivalently, parallel to the XY plane.

As shown in FIG. 1 and FIG. 2, the first surface 21b includes a first region R1, a second region R2 and a third region R3. The first region R1 is the region on which the protruding portion 22 lies. The first region R1 has an edge located in the first front end face 20a. The second region R2 is the region opposed to part of the plasmon generator 40. The second region R2 is contiguous with the first region R1 and is located farther from the first front end face 20a than is the first region R1. The width of the second region R2 in the X direction decreases toward the first region R1. The third region R3 is a region of the first surface 21b other than the first and second regions R1 and R2.

As shown in FIG. 1, FIG. 2 and FIG. 4, the protruding portion 22 lies on the first region R1. The protruding portion 22 is shaped to be long in the X direction. The protruding portion 22 has: a first end face 22a constituting part of the first front end face 20a; a second end face 22b opposite to the first end face 22a; a top surface 22c; a bottom surface 22d; and two side surfaces 22e and 22f. The two side surfaces 22e and 22f are located more inwardly in the X direction than the two side surfaces 21d and 21e of the main body portion 21.

In the present embodiment, the second end face 22b is inclined with respect to the medium facing surface 60. More specifically, as shown in FIG. 1 and FIG. 2, the second end face 22b has a first edge E1 in contact with the first surface 21b of the main body portion 21, and a second edge E2 farthest from the first surface 21b. The second edge E2 is located closer to the first front end face 20a of the core 20 than is the first edge E1. The distance from the medium facing surface 60 to an arbitrary point on the second end face 22b decreases with increasing distance from the arbitrary point to the first edge E1. The second end face 22b preferably forms an angle in the range of, for example, 45° to 80° with respect to the Z direction (the second direction).

As shown in FIG. 1 and FIG. 2, the receiving-portion-forming layer 23 lies on the third region R3 and has a top surface 23a. The top surface 23a of the receiving-portion-forming layer 23 is located at the same level as the top surface 22c of the protruding portion 22. Portions of the receiving-portion-forming layer 23 located on opposite sides of the second region R2 in the X direction are in contact with the second end face 22b of the protruding portion 22. The protruding portion 22 and the receiving-portion-forming layer 23 define therebetween a receiving portion 200. The receiving portion 200 is located near the first front end face 20a, and the planar shape, i.e., the shape as viewed from above, of the receiving portion 200 corresponds to that of a first portion of the plasmon generator 40 to be described later. As shown in FIG. 2, the receiving-portion-forming layer 23 has five wall faces defining the periphery of the receiving portion 200. The cladding layer 24 covers the second region R2 of the first surface 21b, part of the second end face 22b of the protruding portion 22, the five wall faces of the receiving-portion-forming layer 23, the top surface 22c of the protruding portion 22, and the top surface 23a of the receiving-portion-forming layer 23.

In FIG. 1 and FIG. 2, the symbol 23b represents one of the five wall faces of the receiving-portion-forming layer 23 that is located farther from the medium facing surface 60 than is the second region R2. This wall face 23b may be perpendicular to the Y direction, or equivalently, parallel to the medium facing surface 60, or may be inclined with respect to the medium facing surface 60. Where the wall face 23b is inclined with respect to the medium facing surface 60, the distance from the medium facing surface 60 to an arbitrary point on the wall face 23b increases with increasing distance from the arbitrary point to the first surface 21b of the main body portion 21. FIG. 1 and FIG. 2 show an example in which the wall face 23b is inclined with respect to the medium facing surface 60.

As shown in FIG. 1, FIG. 3 and FIG. 4, the plasmon generator 40 has a second front end face 40a lying at an end of the plasmon generator 40 in the direction of travel of the laser light 50 (the first direction), and a rear end face 40b opposite to the second front end face 40a. The second front end face 40a generates near-field light on the principle to be described later. The second front end face 40a is located in the medium facing surface 60 along with the first front end face 20a of the core 20 and the end face 29a of the main pole 29.

As shown in FIG. 1, the plasmon generator 40 includes a first metal portion 401, a multilayer film portion 402, and a second metal portion 403. The first metal portion 401 lies on the adhesion layer 39. The first metal portion 401 has a top surface located at a higher level than the top surface of a portion of the adhesion layer 39 that lies on the top surface 22c of the protruding portion 22 and the top surface 23a of the receiving-portion-forming layer 23. The multilayer film portion 402 and the second metal portion 403 lie on the first metal portion 401. The heat sink 26 is in contact with the top surfaces of the multilayer film portion 402 and the second metal portion 403.

The first metal portion 401 is formed of a metal material. The metal material used to form the first metal portion 401 may be one of Au, Ag, Al and Cu, for example.

As shown in FIG. 1, the first metal portion 401 includes a main portion 401A and a bonding portion 401B. In FIG. 1 the boundary between the main portion 401A and the bonding portion 401B is indicated in a dotted line. Most part of the main portion 401A is received in the receiving portion 200 with the cladding layer 24 and the adhesion layer 39 interposed between the main portion 401A and each of the main body portion 21, the protruding portion 22 and the receiving-portion-forming layer 23. The boundary between the main portion 401A and the bonding portion 401B is located at the same level as the top surface of the portion of the adhesion layer 39 that lies on the top surface 22c of the protruding portion 22 and the top surface 23a of the receiving-portion-forming layer 23. The bonding portion 401B has an end located in the second front end face 40a and an end located in the rear end face 40b, and lies astride the main portion 401A and the adhesion layer 39. The bonding portion 401B has the function of bonding the multilayer film portion 402 and the second metal portion 403 to the main portion 401A.

The main portion 401A has a thickness in the range of 80 to 300 nm, for example. The bonding portion 401B has a thickness in the range of 1 to 5 nm, for example.

As shown in FIG. 3, the multilayer film portion 402 includes at least a first metal layer M1, a second metal layer M2, and an intermediate layer N1. The intermediate layer N1 is interposed between the first metal layer M1 and the second metal layer M2. Each of the first metal layer M1, the second metal layer M2 and the intermediate layer N1 has an end located in the second front end face 40a. Each of the first and second metal layers M1 and M2 is formed of a metal material. The intermediate layer N1 is formed of a material that is higher in Vickers hardness than the metal material used to form the first metal layer M1 and the metal material used to form the second metal layer M2. The material used to form the intermediate layer N1 may be a metal material different from the metal material used to form the first metal layer M1 and the metal material used to form the second metal layer M2, or may be a dielectric material. Hereinafter, the metal material used to form the first metal layer M1 and the metal material used to form the second metal layer M2 will each be referred to as the metal layer material, and the material used to form the intermediate layer N1 will be referred to as the intermediate layer material. The intermediate layer material is higher in Vickers hardness than the metal layer material. Where the intermediate layer material is a metal material, the metal layer material is preferably higher in electrical conductivity than the intermediate layer material.

In the example shown in FIG. 1, the intermediate layer N1 and the second metal layer M2 are stacked in this order on the first metal layer M1. In this example, the multilayer film portion 402 further includes a second intermediate layer N2, a third metal layer M3, a third intermediate layer N3, a fourth metal layer M4, and a protective layer N4 stacked in this order on the second metal layer M2. Each of the second intermediate layer N2, the third metal layer M3, the third intermediate layer N3, the fourth metal layer M4 and the protective layer N4 has an end located in the second front end face 40a. Each of the metal layers M3 and M4 is formed of the metal layer material. Each of the intermediate layers N2 and N3 and the protective layer N4 is formed the intermediate layer material. The protective layer N4 has the function of protecting the plasmon generator 40 and the function of enhancing adhesion of the dielectric layers 27 and 28 to the plasmon generator 40.

Examples of the metal layer material include Au, Ag, Al and Cu. Examples of metal materials selectable as the intermediate layer material include Zr, ZrN, Ru, Pt, Pd, Ti, Ta, Ni, W, Cr, NiCr, NiFe, Co, Cu, TiW, TiN, Mo, Hf, and Rh. Examples of dielectric materials selectable as the intermediate layer material include $SiO_2$, alumina, MgO, amorphous SiC, tantalum oxide, SiON, $ZrO_x$, $HfO_x$, and $NbO_x$, where "x" in $ZrO_x$, $HfO_x$ and $NbO_x$ represents any number greater than zero. When the metal layer material is Cu, the intermediate layer material is other than Cu.

As far as the requirement that the intermediate layer material be higher in Vickers hardness than the metal layer material is satisfied, the materials used to form the metal layers M1 to M4 may all be the same or may be different from each other, or some of them may be the same. Likewise, the materials used to form the intermediate layers N1 to N3 and the protective layer N4 may all be the same or may be different from each other, or some of them may be the same.

The intermediate layers N1 to N3 and the protective layer N4 may be smaller in thickness than the metal layers M1 to M4. The thickness of each of the metal layers M1 to M4 preferably falls within the range of 5 to 25 nm, and the thickness of each of the intermediate layers N1 to N3 and the protective layer N4 preferably falls within the range of 0.5 to 2 nm.

For example, each of the metal layers M1 to M4 may be a 10- to 20-nm-thick layer of Au, and each of the intermediate layers N1 to N3 and the protective layer N4 may be a 0.5- to 1-nm-thick layer of Zr. Alternatively, each of the metal layers M1 to M4 may be a 5- to 25-nm-thick layer of Au, and each of the intermediate layers N1 to N3 and the protective layer N4 may be a 0.5- to 2-nm-thick layer of ZrN.

As shown in FIG. 1 to FIG. 3, the plasmon generator 40 has a groove 40c which opens in the top surface of the multilayer film portion 402 at a position away from the medium facing surface 60 and receives the second metal portion 403. The bottom of the groove 40c may be at a higher or lower level than the top surface of the bonding portion 401B of the first metal portion 401, or at the same level as the top surface of the bonding portion 401B. In the example shown in FIG. 1, the bottom of the groove 40c is at the same level as the top surface of the bonding portion 401B, and the groove 40c penetrates all the layers constituting the multilayer film portion 402. As shown in FIG. 3, the width of the groove 40c in the X direction decreases toward the second front end face 40a.

The second metal portion 403 is received in the groove 40c. The second metal portion 403 is formed of a metal material. The metal material used to form the second metal portion 403 may be one of Au, Ag, Al and Cu, for example. The second metal portion 403 has the function of enhancing the heat dissipation performance of the plasmon generator 40 and thereby suppressing a temperature rise of the plasmon generator 40. The second metal portion 403 is not an essential component of the plasmon generator 40, and can be dispensed with.

As shown in FIG. 1 and FIG. 3, the plasmon generator 40 includes a first portion 41 and a second portion 42 adjacent in the Z direction (the second direction). Note that FIG. 3 depicts the first portion 41 and the second portion 42 as separate from each other. The first portion 41 is constituted of the main portion 401A of the first metal portion 401. Thus, at least part of the first portion 41 is received in the receiving portion 200. The second portion 42 is constituted of the bonding portion 401B of the first metal portion 401, the multilayer film portion 402 and the second metal portion 403. The second portion 42 thus includes at least the first metal layer M1, the second metal layer M2 and the intermediate layer N1. The dotted line in FIG. 1 also indicates the boundary between the first portion 41 and the second portion 42.

The second portion 42 includes the second front end face 40a and the rear end face 40b. The second front end face 40a has a width in the range of 5 to 40 nm, for example. No part of the first portion 41 forms any part of the second front end face 40a.

The first portion 41 (the main portion 401A) has a bottom surface opposed to the second region R2, and six side surfaces opposed to a portion of the second end face 22b of the protruding portion 22 and the five wall faces of the receiving-portion-forming layer 23 defining the periphery of the receiving portion 200. The second end face 22b of the protruding portion 22 is located closer to the medium facing surface 60 than is the first portion 41 of the plasmon generator 40.

As shown in FIG. 1, FIG. 3 and FIG. 4, the first portion 41 includes a first plasmon exciting portion 40e1 and a second plasmon exciting portion 40e2. The first plasmon exciting portion 40e1 is formed of the bottom surface of the first portion 41. The second plasmon exciting portion 40e2 is formed of one of the six side surfaces of the first portion 41, the one of the six side surfaces being located closer to the medium facing surface 60 than is the first plasmon exciting portion 40e1 (the bottom surface of the first portion 41) and contiguous with the first plasmon exciting portion 40e1. As shown in FIG. 3 and FIG. 4, the width of the first plasmon exciting portion 40e1 in the X direction decreases toward the second front end face 40a. The width of the second plasmon exciting portion 40e2 in the X direction is equal to that of the first plasmon exciting portion 40e1 at the boundary between the first and second plasmon exciting portions 40e1 and 40e2, and gradually decreases toward the second front end face 40a, then becoming constant.

The first plasmon exciting portion 40e1 is opposed to the second region R2 with the cladding layer 24 interposed therebetween. The second region R2 and the first plasmon exciting portion 40e1 are adjacent in the Z direction (the second direction). The first plasmon exciting portion 40e1 is perpendicular to the Z direction (the second direction), or equivalently, parallel to the XY plane.

The second plasmon exciting portion 40e2 is opposed to the second end face 22b of the protruding portion 22 with the cladding layer 24 interposed therebetween, and is not exposed in the medium facing surface 60. As shown in FIG. 1, the second plasmon exciting portion 40e2 is inclined in a similar manner as the second end face 22b. More specifically, the second plasmon exciting portion 40e2 has a third edge E3 in contact with the first plasmon exciting portion 40e1, and a fourth edge E4 in contact with the second portion 42 of the plasmon generator 40. The fourth edge E4 is located closer to the first front end face 20a of the core 20 than is the third edge E3. The distance from the medium facing surface 60 to an arbitrary point on the second plasmon exciting portion 40e2 decreases with increasing distance from the arbitrary point to the third edge E3. With respect to the Z direction (the second direction), the second plasmon exciting portion 40e2 preferably forms an angle in the same range as the preferred range of the angle that the second end face 22b forms with respect to the Z direction (the second direction).

In FIG. 1, FIG. 3 and FIG. 4, the symbol 41a represents one of the side surfaces of the first portion 41, the one being located farther from the medium facing surface 60 than is the first plasmon exciting portion 40e1 (the bottom surface of the first portion 41) and contiguous with the first plasmon exciting portion 40e1. The side surface 41a is opposed to the wall face 23b with the cladding layer 24 interposed therebetween. Like the wall face 23b, the side surface 41a may be perpendicular to the Y direction or inclined with respect to the Z direction (the second direction). Where the side surface 41a is inclined with respect to the Z direction, the distance from the medium facing surface 60 to an arbitrary point on the side surface 41a decreases with increasing distance from the arbitrary point to the top surface of the first portion 41, that is, with decreasing distance from the arbitrary point to the top surface 1a of the substrate 1. FIG. 1 to FIG. 3 show an example in which the side surface 41a is inclined with respect to the Z direction.

As shown in FIG. 3 and FIG. 4, the second portion 42 includes a narrow portion located near the medium facing surface 60, and a wide portion which is located farther from the medium facing surface 60 than is the narrow portion. The width of the narrow portion in the X direction may be constant regardless of distance from the medium facing surface 60, or may decrease toward the medium facing surface 60. The width of the wide portion in the X direction is equal to that of the narrow portion at the boundary position between the narrow portion and the wide portion, and is greater than that of the narrow portion in the other positions.

The cladding layer 24 includes an interposition portion 24a interposed between a combination of the second region R2 and the second end face 22b of the protruding portion 22 and a combination of the first and second plasmon exciting portions 40e1 and 40e2. Since the cladding layer 24 is part of the cladding, the cladding can be said to include the interposition portion 24a. The interposition portion 24a has a thickness within the range of, for example, 10 to 100 nm, and preferably within the range of 20 to 30 nm.

Now, the principle of generation of near-field light in the present embodiment and the principle of thermally-assisted magnetic recording using near-field light will be described in detail. Laser light emitted from a laser diode (not illustrated) enters the incidence end of the main body portion 21 of the core 20. As shown in FIG. 5, the laser light 50 propagates through the main body portion 21 of the core 20 toward the medium facing surface 60, and reaches the vicinity of the plasmon generator 40. Each of the second region R2 and the second end face 22b of the protruding portion 22 generates evanescent light based on the laser light 50 propagating through the core 20 (the main body portion 21). More specifically, when the laser light 50 is totally reflected at the second region R2, the second region R2 generates first evanescent light permeating into the interposition portion 24a. When the laser light 50 is totally reflected at the second end face 22b of the protruding portion 22, the second end face 22b of the protruding portion 22 generates second evanescent light permeating into the interposition portion 24a.

In the plasmon generator 40, first surface plasmons are excited on the first plasmon exciting portion 40e1 through coupling with the first evanescent light. Second surface plasmons are excited on the second plasmon exciting portion 40e2 through coupling with the second evanescent light. The first and second surface plasmons propagate along the surfaces of the first and second portions 41 and 42 to reach the second front end face 40a. As a result, the first and second surface plasmons concentrate at the second front end face 40a, and near-field light is generated from the second front end face 40a based on the first and second surface plasmons.

The near-field light generated from the second front end face 40a is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 29, whereby data is written.

A method of manufacturing the thermally-assisted magnetic recording head according to the present embodiment will now be described. The method of manufacturing the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality pre-head portions arranged in rows, the plurality of pre-head portions becoming individual thermally-assisted magnetic recording heads later; and cutting the substructure to separate the plurality of pre-head portions from each other and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will be described in more detail below with attention focused on a single thermally-assisted magnetic recording head. The following descriptions include the description of a method of manufacturing the near-field light generator according to the present embodiment. The method of manufacturing the thermally-assisted magnetic recording head first forms the insulating layer 2, the bottom shield layer 3, and the bottom shield gap film 4 in this order on the substrate 1. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the return pole layer 11 is formed on the nonmagnetic layer 10. Next, an insulating layer (not illustrated) is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. The shield layer 12 and the coupling layer 13 are then formed on the return pole layer 11 at the positions of the two openings. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, although not illustrated, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Next, the main body portion 21 of the core 20 is formed on the cladding layer 18. The main body portion 21 is formed by, for example, first forming a dielectric layer over the entire top surface of the stack and then patterning the dielectric layer by etching a portion of the dielectric layer by reactive ion etching (hereinafter referred to as RIE). Next, although not illustrated, the second layers of the coupling portions 17A and 17B are formed on the first layers of the coupling portions 17A and 17B, respectively. Next, the cladding layer 19 is formed over the entire top surface of the stack. The cladding layer 19 is then polished by, for example, CMP, until the main body portion 21 and the second layers of the coupling portions 17A and 17B are exposed.

Figure 11:
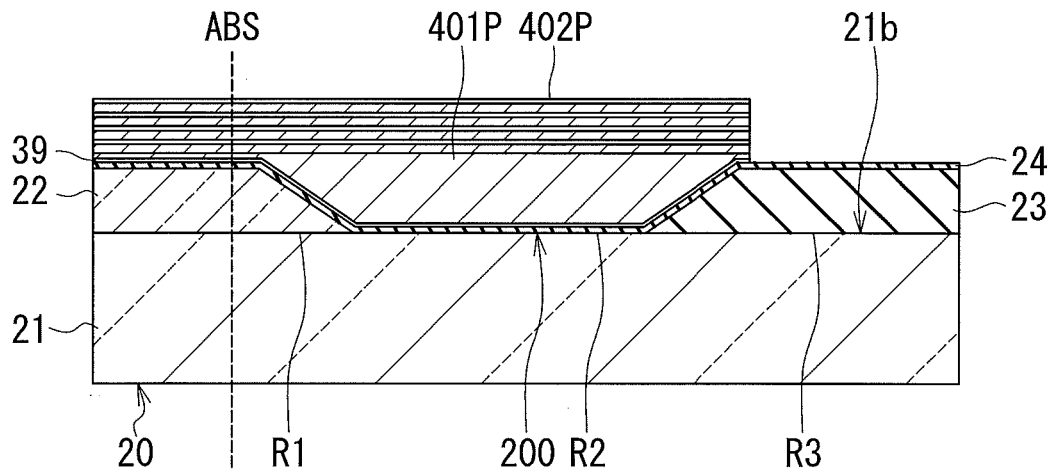
FIG. 11 is a cross-sectional view showing a step that follows the step shown in FIG. 10.
Figure 12:
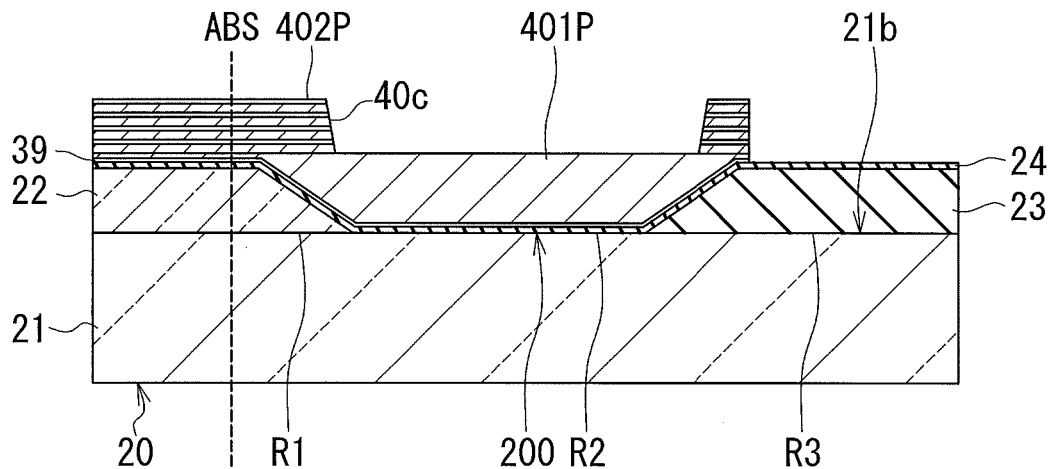
FIG. 12 is a cross-sectional view showing a step that follows the step shown in FIG. 11.
Figure 13:
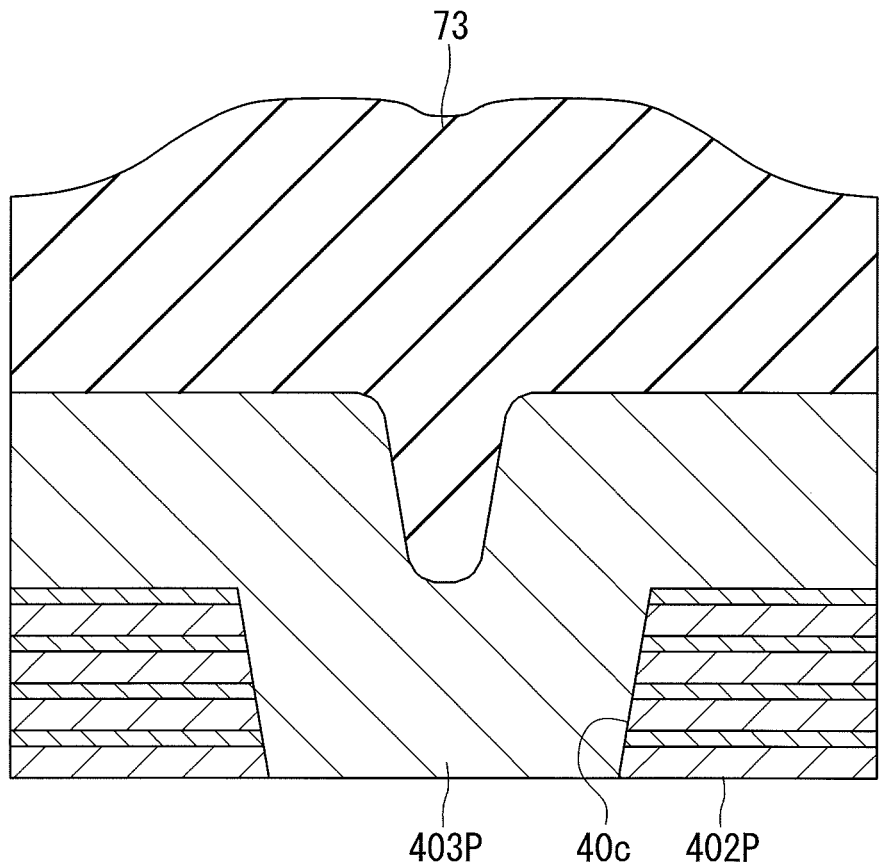
FIG. 13 is a cross-sectional view showing a step that follows the step shown in FIG. 12.
Figure 14:
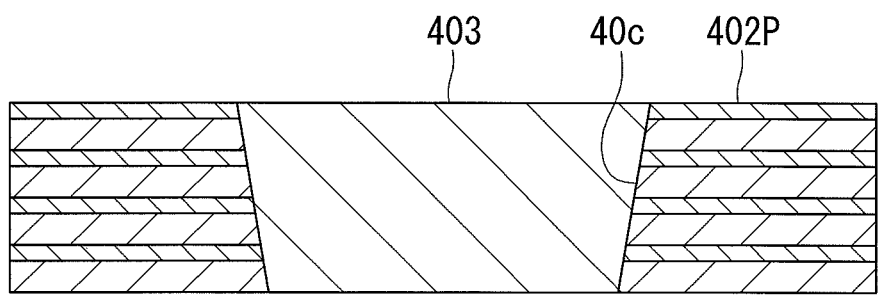
FIG. 14 is a cross-sectional view showing a step that follows the step shown in FIG. 13.
Figure 15:
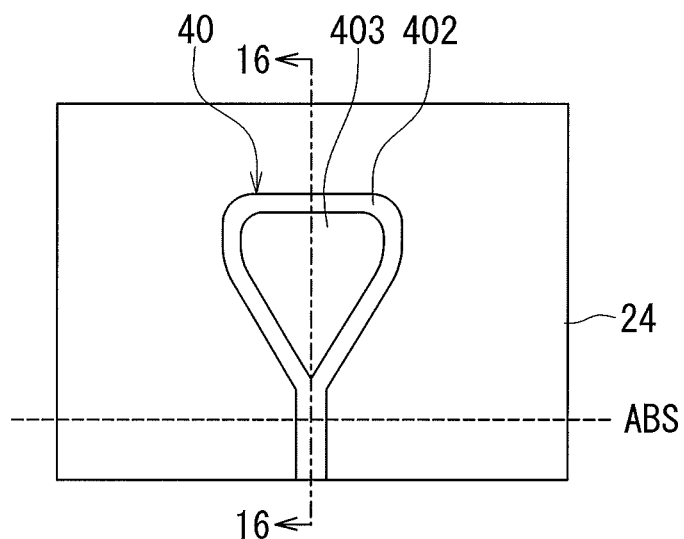
FIG. 15 is a plan view showing a step that follows the step shown in FIG. 14.

Reference is now made to FIG. 7 to FIG. 16 to describe steps to be performed after the polishing of the cladding layer 19 up to the formation of the plasmon generator 40. FIG. 7 to FIG. 16 each illustrate a stack of layers formed in the process of manufacturing the thermally-assisted magnetic recording head. FIGS. 7 to 12 and 16 each show a cross section that intersects the end face 29a of the main pole 29 and that is perpendicular to the medium facing surface 60 and to the top surface 1a of the substrate 1. Note that portions located below the main body portion 21 are omitted from FIGS. 7 to 12 and 16. FIG. 15 is a plan view of the stack. In FIGS. 7 to 12, 15 and 16, the symbol "ABS" indicates the position at which the medium facing surface 60 is to be formed. FIGS. 13 and 14 each show a cross section parallel to the position ABS.

Figure 7:
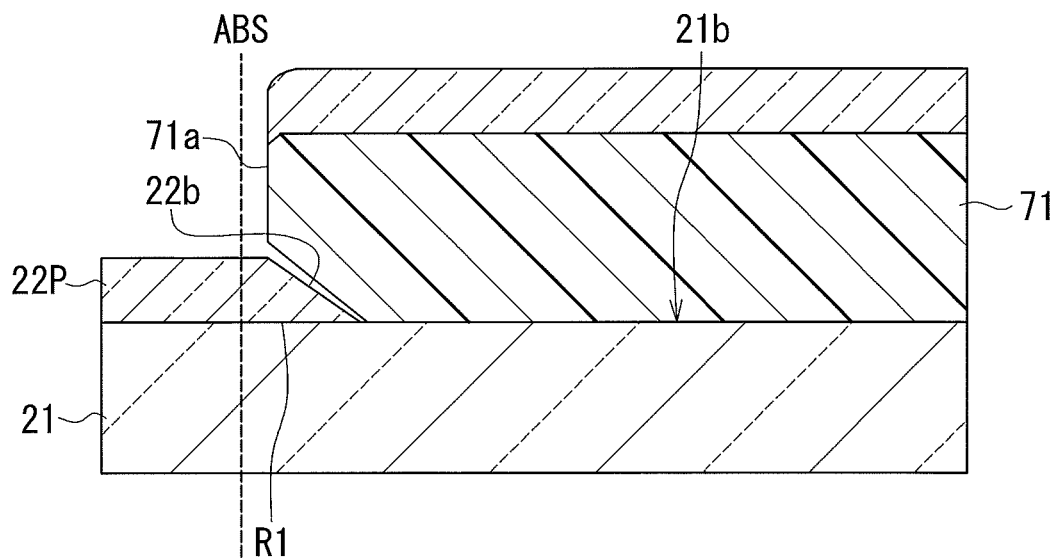
FIG. 7 is a cross-sectional view showing a step of a method of manufacturing the thermally-assisted magnetic recording head according to the first embodiment of the invention.

FIG. 7 shows a step that follows the polishing of the cladding layer 19. In this step, first, a photoresist mask 71 is formed on the top surface of the stack. The photoresist mask 71 has an opening 71a shaped to correspond to the shape of the protruding portion 22 to be formed later, and covers the second and third regions R2 and R3 (see FIG. 1 and FIG. 2) of the first surface 21b of the main body portion 21. The opening 71a of the photoresist mask 71 includes an inclined portion to define the shape of the second end face 22b of the protruding portion 22 to be formed later. Next, a dielectric layer 22P of a dielectric material that is to form the protruding portion 22 is formed on the top surface of the stack. The dielectric layer 22P is formed on a part of the first surface 21b of the main body portion 21 other than the second and third regions R2 and R3. This part of the first surface 21b includes the first region R1. The dielectric layer 22P is formed also on the photoresist mask 71. Next, the photoresist mask 71 is lifted off. As a result, the remainder of the dielectric layer 22P on the first surface 21b of the main body portion 21 becomes the protruding portion 22, and the core 20 is thereby completed.

Figure 8:
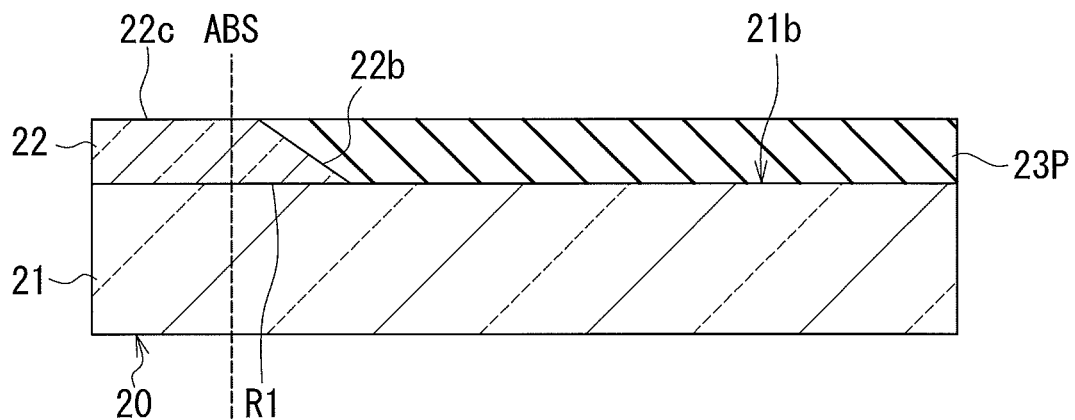
FIG. 8 is a cross-sectional view showing a step that follows the step shown in FIG. 7.

FIG. 8 shows the next step. In this step, first, a dielectric layer 23P of a dielectric material that is to form the receiving-portion-forming layer 23 is formed over the entire top surface of the stack. The dielectric layer 23P is then polished by, for example, CMP, until the protruding portion 22 is exposed. The top surface 22c of the protruding portion 22 and the top surface of the dielectric layer 23P are thereby made even with each other.

Figure 9:
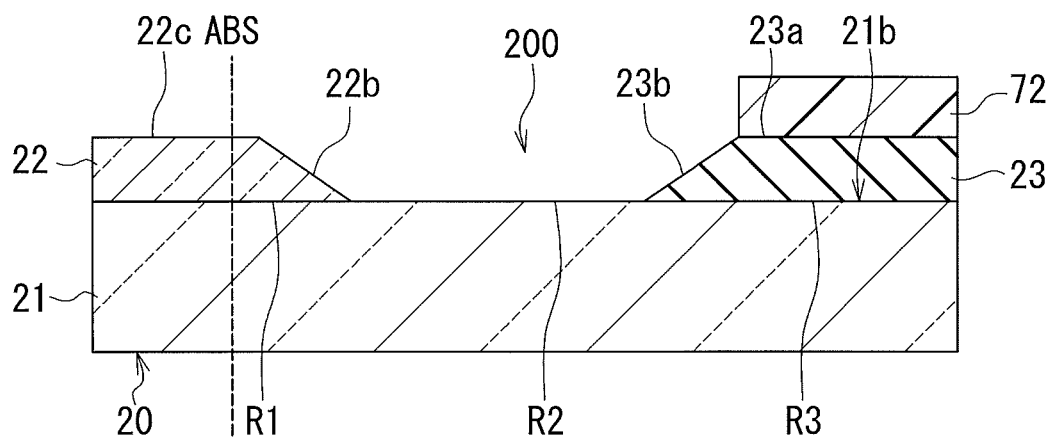
FIG. 9 is a cross-sectional view showing a step that follows the step shown in FIG. 8.

FIG. 9 shows the next step. In this step, first, a photoresist mask 72 is formed on the dielectric layer 23P. The photoresist mask 72 covers the dielectric layer 23P except a portion thereof where the receiving portion 200 is to be formed. Using the photoresist mask 72, the dielectric layer 23P is then taper-etched by, for example, RIE, so that the receiving portion 200 is formed. This etching is performed under such conditions that the materials to form the main body portion 21 and the protruding portion 22 are not etched at all or are hardly etched whereas the material to form the receiving-portion-forming layer 23 is selectively etched. This etching proceeds until the first surface 21b of the main body portion 21 is exposed. A portion of the dielectric layer 23P that remains after this etching becomes the receiving-portion-forming layer 23. The photoresist mask 72 is then removed.

Figure 10:
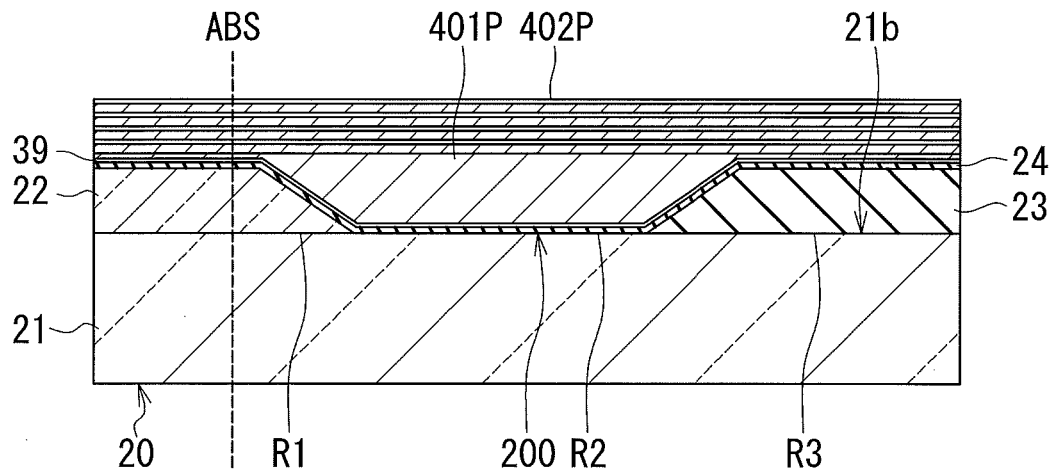
FIG. 10 is a cross-sectional view showing a step that follows the step shown in FIG. 9.

FIG. 10 shows the next step. In this step, first, the cladding layer 24 and the adhesion layer 39 are formed in this order over the entire top surface of the stack. Then, a metal film 401P is formed on the adhesion layer 39 by sputtering, for example. The metal film 401P will later become the first metal portion 401 of the plasmon generator 40. The metal film 401P is formed such that the top surface of its portion received in the receiving portion 200 is higher in level than the top surface of the first metal portion 401 to be formed later. Then, the metal film 401P is polished by, for example, CMP, until the top surface of the metal film 401P reaches the level of the top surface of the first metal portion 401 (the top surface of the bonding portion 401B) to be formed later. Next, a plurality of films that will later become the layers of the multilayer film portion 402 of the plasmon generator 40 are formed in succession on the metal film 401P by sputtering, for example. A multilayer film 402P composed of the plurality of films is thereby formed.

FIG. 11 shows the next step. In this step, first, an etching mask (not illustrated) is formed on the multilayer film 402P. The non-illustrated etching mask covers a portion of the multilayer film 402P that is located closer to the position ABS, which is the position at which the medium facing surface 60 is to be formed, than to the rear end face 40b of the plasmon generator 40 to be formed later. Next, portions of the adhesion layer 39, the metal film 401P and the multilayer film 402P other than their portions lying under the non-illustrated etching mask are removed by ion beam etching (hereinafter referred to as IBE), for example. The non-illustrated etching mask is then removed.

FIG. 12 shows the next step. In this step, the multilayer film 402P is etched by, for example, IBE, to thereby form the groove 40c to receive the second metal portion 403 to be formed later.

FIG. 13 shows the next step. FIG. 13 illustrates a cross section that is parallel to the position ABS and that intersects the groove 40c. In this step, first, a photoresist mask (not illustrated) having an opening shaped to correspond to the planar shape of the plasmon generator 40 is formed on the top surface of the stack. Next formed is a metal film 403P which will later become the second metal portion 403 of the plasmon generator 40. The metal film 403P is formed to fill the groove 40c and to have a top surface located at a higher level than the top surface of the multilayer film 402P. Next, a dielectric layer 73 of a dielectric material is formed over the entire top surface of the stack. The non-illustrated photoresist mask is then lifted off.

FIG. 14 shows the next step. FIG. 14 illustrates a cross section taken at the same position as FIG. 13. In this step, first, the metal film 403P and the dielectric layer 73 are polished by, for example, CMP, until the top surface of the multilayer film 402P is exposed. This makes the metal film 403P into the second metal portion 403. Then, the polished surface is slightly etched by IBE, for example.

Figure 16:
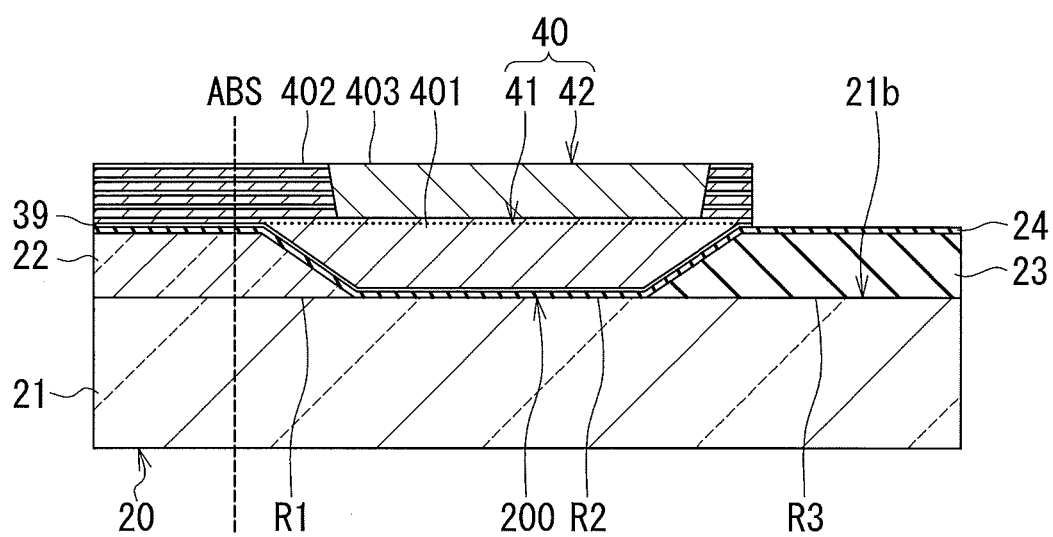
FIG. 16 is a cross-sectional view showing a cross section taken along line 16-16 in FIG. 15.

FIG. 15 and FIG. 16 show the next step. FIG. 16 is a cross-sectional view showing a cross section taken along line 16-16 in FIG. 15. In this step, first, an etching mask (not illustrated) whose planar shape corresponds to the planar shape of the plasmon generator 40 is formed on the top surface of the stack. Then, portions of the adhesion layer 39, the metal film 401P and the multilayer film 402P other than their portions lying under the non-illustrated etching mask are removed by IBE, for example. The plasmon generator 40 and the near-field light generator are thereby completed. In FIG. 16, the boundary between the first portion 41 and the second portion 42 of the plasmon generator 40 is indicated in a dotted line. As shown in FIG. 16, at least part of the first portion 41 is formed to be received in the receiving portion 200. The non-illustrated etching mask is then removed.

As has been described, the method of manufacturing the near-field light generator according to the present embodiment includes the steps of forming the core 20; forming the cladding; and forming the plasmon generator 40 after the step of forming the core 20. The step of forming the core 20 includes the step of forming the main body portion 21 and the step of forming the protruding portion 22 on the first region R1 of the first surface 21b of the main body portion 21. The step of forming the cladding includes the step of forming the receiving-portion-forming layer 23 before the step of forming the plasmon generator 40.

Now, steps to follow the step shown in FIG. 15 and FIG. 16 will be described with reference to FIG. 5 and FIG. 6. First, the dielectric layer 25 is formed over the entire top surface of the stack. The dielectric layer 25 is then polished by, for example, CMP, until the plasmon generator' 40 is exposed. Next, the heat sink 26 is formed on the plasmon generator 40 and the dielectric layer 25. The dielectric layer 27 is then formed to cover the heat sink 26. The dielectric layer 28 is then formed to cover the dielectric layer 27.

The receiving-portion-forming layer 23, the cladding layer 24 and the dielectric layers 25, 27 and 28 are then selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 29 is formed on the dielectric layer 28, and the coupling layer 30 is formed on the third layers of the coupling portions 17A and 17B and the dielectric layer 28. Next, the dielectric layer 31 is formed over the entire top surface of the stack. The dielectric layer 31 is then polished by, for example, CMP, until the main pole 29 and the coupling layer 30 are exposed. The top surfaces of the main pole 29, the coupling layer 30 and the dielectric layer 31 are thereby made even with each other.

Next, the coil 32 is formed on the dielectric layer 31. The insulating layer 33 is then formed to cover the coil 32. Next, the yoke layer 34 is formed over the main pole 29, the coupling layer 30 and the insulating layer 33. Then, the protective layer 35 is formed to cover the yoke layer 34. Wiring, terminals, and other components are then formed on the top surface of the protective layer 35. When the substructure is completed thus, the step of forming the medium facing surface 60 is performed. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, IBE, after the polishing step.

The effects of the near-field light generator and the thermally-assisted magnetic recording head according to the present embodiment will now be described. In the present embodiment, the plasmon generator 40 includes the first portion 41 and the second portion 42. The second portion 42 includes the second front end face 40a of the plasmon generator 40. The first portion 41 includes the first and second plasmon exciting portions 40e1 and 40e2. The present embodiment allows the dimension of the second front end face 40a in the Z direction and the area of the second front end face 40a to be smaller than in the case where the thickness of the entire plasmon generator and the dimension of the front end face of the plasmon generator in the Z direction are equal. Consequently, the present embodiment makes it possible to increase the volume and the surface area of the first portion 41 to allow a lot of surface plasmons to be excited on the plasmon generator 40 without increasing the area of the second front end face 40a.

Further, since the second front end face 40a is allowed to have a small area, it is possible to prevent the second front end face 40a from being significantly recessed relative to the other parts of the medium facing surface 60 in the step of forming the medium facing surface 60. The present embodiment thus makes it possible to prevent degradation in heating performance of the plasmon generator 40 that would occur where the second front end face 40a is significantly recessed relative to the other parts of the medium facing surface 60. Moreover, since the second front end face 40a is allowed to have a small area, it is possible to prevent the plasmon generator 40 from expanding and significantly protruding toward the recording medium 80 when the plasmon generator 40 increases in temperature. The present embodiment thus makes it possible to prevent damage to the recording medium 80, breakage of the plasmon generator 40 or the protective film covering the medium facing surface 60, and corrosion of the plasmon generator 40.

Further, in the present embodiment, since the first portion 41 does not include the second front end face 40a of the plasmon generator 40, the material for the first portion 41 can be selected from any metal materials that have high electrical conductivity suitable for excitation and propagation of surface plasmons, without the need for considering mechanical strength. This allows for appropriate excitation and propagation of surface plasmons on the first portion 41.

Further, in the present embodiment, the second portion 42 includes at least the first metal layer M1, the second metal layer M2 and the intermediate layer N1. The intermediate layer N1 is interposed between the first metal layer M1 and the second metal layer M2. The intermediate layer N1 is formed of a material that is higher in Vickers hardness than the metal material used to form the first metal layer M1 and the metal material used to form the second metal layer M2. This makes it possible to prevent the first metal layer M1 and the second metal layer M2 sandwiching the intermediate layer N1 from being deformed. Further, the present embodiment allows the second portion 42 as a whole to be higher in mechanical strength than in a case where the second portion consists only of a single metal layer formed of the metal layer material described previously. Consequently, the present embodiment makes it possible to prevent the second portion 42 from being deformed or damaged, and the second front end face 40a from being significantly recessed relative to the other parts of the medium facing surface 60 in the step of forming the medium facing surface 60 or due to a temperature change of the plasmon generator 40.

The above-described effects become more noticeable when the second portion 42 includes one or more pairs of an intermediate layer and a metal layer in addition to the first metal layer M1, the second metal layer M2 and the intermediate layer N1.

Further, in the present embodiment, the core 20 includes the main body portion 21 and the protruding portion 22. The first and second surfaces 21b and 21c of the main body portion 21 are flat surfaces parallel to each other, and the first surface 21b includes the second region R2 to generate the first evanescent light. The thickness (the dimension in the Z direction) of the main body portion 21 is constant regardless of the distance from the incidence end of the main body portion 21, and the center of the main body portion 21 in the thickness direction coincides with the center of the incidence end of the main body portion 21 in the thickness direction. Consequently, when the laser light 50 has entered the incidence end of the main body portion 21 with the optical axis of the laser light 50 aligned with the center of the incidence end in the thickness direction, the optical axis coincides with the center of the main body portion 21 in the thickness direction regardless of the distance from the incidence end of the main body portion 21. Thus, in the present embodiment, there is no reduction in efficiency of propagation of the laser light 50 resulting from a misalignment occurring between the optical axis of the laser light 50 and the center of the main body portion 21 in the thickness direction in the course of travel of the laser light 50 to reach the second region R2. The present embodiment thus allows a larger amount of first evanescent light to be generated from the second region R2, thereby allowing a lot of first surface plasmons to be excited on the first plasmon exciting portion 40e1 of the plasmon generator 40.

Further, the present embodiment allows the second evanescent light to be generated from the second end face 22b of the protruding portion 22 of the core 20 and allows the second surface plasmons to be excited on the second plasmon exciting portion 40e2 of the plasmon generator 40. Thus, in the present embodiment, it is possible to excite a larger amount of surface plasmons on the plasmon generator 40 than in the case without the protruding portion 22.

Consequently, the present embodiment makes it possible to provide a near-field light generator that allows a lot of surface plasmons to be excited on the plasmon generator 40 and allows the plasmon generator 40 to operate with high reliability, and to provide a thermally-assisted magnetic recording head including such a near-field light generator.

Where the intermediate layer material is a metal material and the metal layer material is higher in electrical conductivity than the intermediate layer material, the intermediate layers N1 to N3 are preferably smaller in thickness than the metal layers M1 to M4. In such a case, it is possible to reduce loss of surface plasmons when the surface plasmons propagate from the end of the metal layer M1 located in the second front end face 40a to the respective ends of the metal layers M2 to M4 located in the second front end face 40a.

The surface plasmons need not necessarily propagate to the respective ends of the metal layers M3 and M4 and the intermediate layers N2 and N3 located in the second front end face 40a. Even in such a case, the metal layers M3 and M4 and the intermediate layers N2 and N3 contribute to the enhancement of the mechanical strength of the plasmon generator 40 as a whole.

Further, the following effects are provided where a metal layer is sandwiched between two intermediate layers in the plasmon generator 40. A metal layer is typically formed of a metal polycrystal. In general, when a metal polycrystal gets hot, a plurality of crystal grains constituting the metal polycrystal aggregate and grow, and can thereby cause the metal polycrystal to be deformed. If a metal layer is sandwiched between two intermediate layers, the metal layer is restrained to some extent by the two intermediate layers. Thus, in such a case, it is possible to prevent the aggregation and growth of the plurality of crystal grains constituting the metal layer (the metal polycrystal) when the metal layer gets hot. This consequently allows for preventing the metal layer from becoming deformed.

In the present embodiment, the second end face 22b of the protruding portion 22 and the second plasmon exciting portion 40e2 are both inclined with respect to the medium facing surface 60. In the second plasmon exciting portion 40e2, the fourth edge E4 is located closer to the first front end face 20a of the core 20 than is the third edge E3. This configuration allows the first surface plasmons excited on the first plasmon exciting portion 40e1 and the second surface plasmons excited on the second plasmon exciting portion 40e2 to propagate through the second plasmon exciting portion 40e2 to reach the vicinity of the second front end face 40a.

It should be noted that if the second end face 22b of the protruding portion 22 and the second plasmon exciting portion 40e2 are parallel to the medium facing surface 60, it becomes difficult to excite the second surface plasmons on the second plasmon exciting portion 40e2, and the first surface plasmons suffer a great loss when they propagate to the second front end face 40a. In the present embodiment, since the second end face 22b of the protruding portion 22 and the second plasmon exciting portion 40e2 are inclined with respect to the medium facing surface 60 as mentioned above, it is possible to excite the second surface plasmons on the second plasmon exciting portions 40e2 and to reduce loss of the first surface plasmons when they propagate to the second front end face 40a.

Consequently, the present embodiment allows the first surface plasmons excited on the first plasmon exciting portion 40e1 and the second surface plasmons excited on the second plasmon exciting portion 40e2 to propagate efficiently to the second front end face 40a. The above-described effect is reduced if the angle formed by each of the second end face 22b and the second plasmon exciting portion 40e2 with respect to the Z direction (the second direction) is close to 0°. On the other hand, if the aforementioned angle is excessively close to 90°, it becomes difficult to form the second end face 22a and the second plasmon exciting portion 40e2. In view of this, the aforementioned angle is preferably in the range of 45° to 80°.

To allow the first surface plasmons excited on the first plasmon exciting portion 40e1 and the second surface plasmons excited on the second plasmon exciting portion 40e2 to propagate efficiently to the second front end face 40a, the fourth edge E4 of the second plasmon exciting portion 40e2 is preferably as close as possible to the second front end face 40a, and is more preferably located in the second front end face 40a. To achieve this, the second edge E2 of the second end face 22b of the protruding portion 22 is preferably as close as possible to the first front end face 20a of the core 20, and is more preferably located in the first front end face 20a.

[Second Embodiment]

Figure 17:
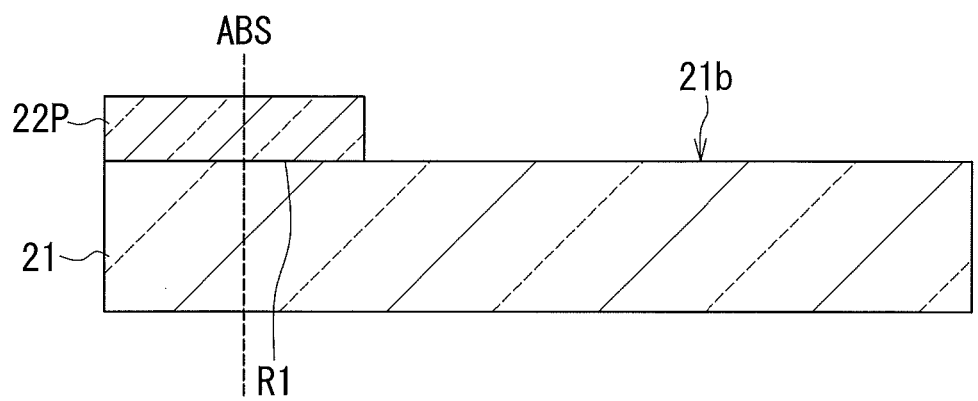
FIG. 17 is a cross-sectional view showing a step of a method of manufacturing a thermally-assisted magnetic recording head according to a second embodiment of the invention.
Figure 18:
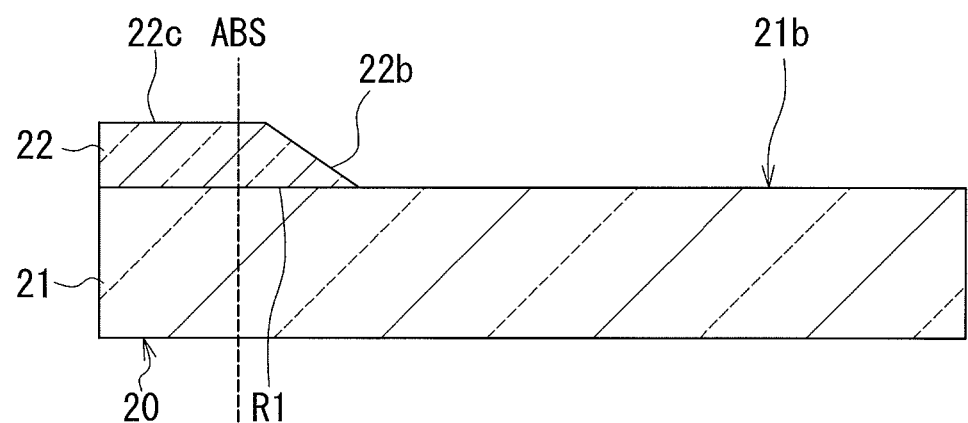
FIG. 18 is a cross-sectional view showing a step that follows the step shown in FIG. 17.

A method of manufacturing a thermally-assisted magnetic recording head according to a second embodiment of the invention will now be described with reference to FIG. 17 and FIG. 18. The following descriptions include the description of a method of manufacturing a near-field light generator according to the present embodiment. FIG. 17 and FIG. 18 each illustrate a stack of layers formed in the process of manufacturing the thermally-assisted magnetic recording head. FIG. 17 and FIG. 18 each show a cross section that intersects the end face 29a of the main pole 29 and that is perpendicular to the medium facing surface 60 and to the top surface 1a of the substrate 1 (see FIG. 5 and FIG. 6). In FIG. 17 and FIG. 18, the symbol "ABS" indicates the position at which the medium facing surface 60 is to be formed.

The method of manufacturing the thermally-assisted magnetic recording head according to the present embodiment is the same as the method according to the first embodiment up to the step of polishing the cladding layer 19 (see FIG. 6). FIG. 17 shows the next step. This step forms an initial protruding portion 22P which will later become the protruding portion 22 of the core 20. The initial protruding portion 22P is formed on a part of the first surface 21b of the main body portion 21 of the core 20 other than the second and third regions R2 and R3 (see FIG. 1 and FIG. 2). This part of the first surface 21b includes the first region R1.

FIG. 18 shows the next step. In this step, first, an etching mask (not illustrated) is formed on the top surface of the stack. Either a photoresist mask or a hard mask is used as this etching mask. This etching mask does not cover a region of the initial protruding portion 22P where the second end face 22b of the protruding portion 22 is to be formed later. Using this etching mask, the initial protruding portion 22P is then taper-etched by, for example, IBE, so as to provide the initial protruding portion 22P with the second end face 22b. This makes the initial protruding portion 22P into the protruding portion 22, and thereby completes the core 20. The non-illustrated etching mask is then removed. The subsequent steps are the same as those in the first embodiment.

As described above, the step of forming the protruding portion 22 in the method of manufacturing the near-field light generator according to the present embodiment includes the step of forming the initial protruding portion 22P on the first region R1 of the first surface 21b of the main body portion 21, and the step of taper-etching the initial protruding portion 22P so that the initial protruding portion 22P is provided with the second end face 22b and thereby becomes the protruding portion 22. The remainder of configuration, function and effects of the present embodiment are similar to those of the first embodiment.

[Third Embodiment]

Figure 19:
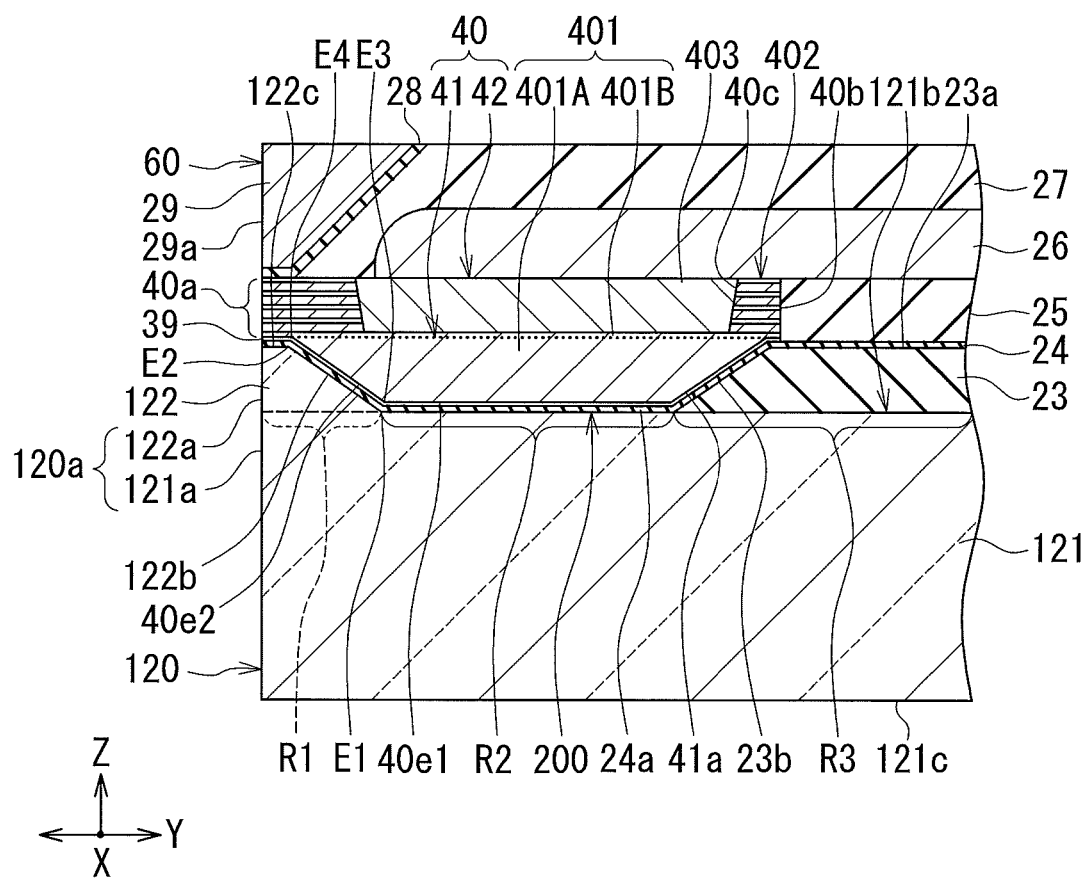
FIG. 19 is a cross-sectional view showing the main part of a thermally-assisted magnetic recording head according to a third embodiment of the invention.

A near-field light generator and a thermally-assisted magnetic recording head according to a third embodiment of the invention will now be described. First, reference is made to FIG. 19 to describe the configurations of the near-field light generator and the thermally-assisted magnetic recording head according to the present embodiment. FIG. 19 is a cross-sectional view showing the main part of the thermally-assisted magnetic recording head according to the present embodiment.

The near-field light generator and the thermally-assisted magnetic recording head according to the present embodiment differ from those according to the first embodiment in the following ways. In the present embodiment, as shown in FIG. 19, the waveguide includes a core 120 in place of the core 20. The location of the core 120 is the same as that of the core 20. The cladding layers 18 and 19 (see FIG. 5 and FIG.

6), the cladding layer 24 and the receiving-portion-forming layer 23 are disposed around the core 120. The core 120 is formed of the same material as the core 20.

The core 120 has a first front end face 120a lying at an end of the core 120 in the direction of travel of the laser light 50 (see FIG. 5) (the first direction). In the present embodiment, the first front end face 120a is located in the medium facing surface 60. Further, the core 120 includes a main body portion 121 and a protruding portion 122 adjacent in the Z direction (the second direction). In FIG. 19, the boundary between the main body portion 121 and the protruding portion 122 is indicated in a broken line. The main body portion 121 and the protruding portion 122 are shaped like the main body portion 21 and the protruding portion 22 of the core 20, respectively. In the present embodiment, however, the main body portion 121 and the protruding portion 122 are integrally formed as described later.

As shown in FIG. 19, the main body portion 121 has: an end face 121a constituting part of the first front end face 120a; a first surface 121b which is a top surface facing toward the plasmon generator 40; a second surface 121c opposite to the first surface 121b; two side surfaces (not illustrated); and an incidence end (not illustrated). The first and second surfaces 121b and 121c are flat surfaces parallel to each other. Both of the first and second surfaces 121b and 121c are perpendicular to the Z direction (the second direction), or equivalently, parallel to the XY plane.

As shown in FIG. 19, the first surface 121b includes a first region R1, a second region R2 and a third region R3. The first to third regions R1 to R3 of the present embodiment are shaped and located in the same manner as the first to third regions R1 to R3 of the first embodiment.

As shown in FIG. 19, the protruding portion 122 lies on the first region R1 of the first surface 121b. The protruding portion 122 has: a first end face 122a constituting part of the first front end face 120a; a second end face 122b opposite to the first end face 122a; a top surface 122c; and two side surfaces (not illustrated). The second end face 122b is inclined with respect to the medium facing surface 60. More specifically, as shown in FIG. 19, the second end face 122b has a first edge E1 in contact with the first surface 121b of the main body portion 121, and a second edge E2 farthest from the first surface 121b. The second edge E2 is located closer to the first front end face 120a of the core 120 than is the first edge E1. The distance from the medium facing surface 60 to an arbitrary point on the second end face 122b decreases with increasing distance from the arbitrary point to the first edge E1. With respect to the Z direction (the second direction), the second end face 122b preferably forms an angle in the same range as the preferred range of the angle that the second end face 22b described in the first embodiment section forms with respect to the Z direction (the second direction).

In the present embodiment, the receiving portion 200 is defined by the protruding portion 122 and the receiving-portion-forming layer 23. Portions of the receiving-portion-forming layer 23 located on opposite sides of the second region R2 of the first surface 121b in the X direction are in contact with portions of the second end face 122b of the protruding portion 122. Another portion of the second end face 122b of the protruding portion 122 is covered with the cladding layer 24.

Each of the second region R2 of the first surface 121b and the second end face 122b of the protruding portion 122 generates evanescent light based on the laser light 50 propagating through the core 120 (the main body portion 121). More specifically, when the laser light 50 is totally reflected at the second region R2, the second region R2 generates first evanescent light permeating into the interposition portion 24a of the cladding layer 24. When the laser light 50 is totally reflected at the second end face 122b of the protruding portion 122, the second end face 122b of the protruding portion 122 generates second evanescent light permeating into the interposition portion 24a of the cladding layer 24.

Figure 20:
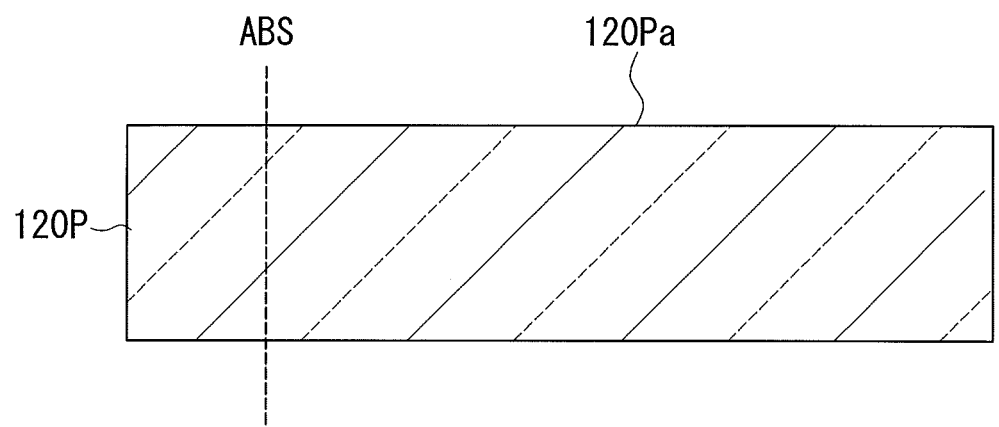
FIG. 20 is a cross-sectional view showing a step of a method of manufacturing the thermally-assisted magnetic recording head according to the third embodiment of the invention.
Figure 21:
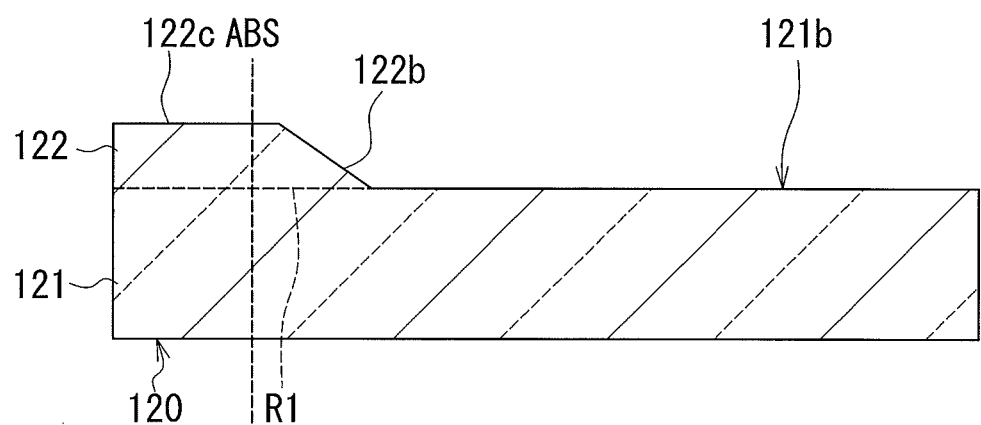
FIG. 21 is a cross-sectional view showing a step that follows the step shown in FIG. 20.

A method of manufacturing the thermally-assisted magnetic recording head according to the present embodiment will now be described with reference to FIG. 20 and FIG. 21. The following descriptions include the description of a method of manufacturing the near-field light generator according to the present embodiment. FIG. 20 and FIG. 21 each illustrate a stack of layers formed in the process of manufacturing the thermally-assisted magnetic recording head. FIG. 20 and FIG. 21 each show a cross section that intersects the end face 29a of the main pole 29 and that is perpendicular to the medium facing surface 60 and to the top surface 1a of the substrate 1 (see FIG. 5 and FIG. 6). In FIG. 20 and FIG. 21, the symbol "ABS" indicates the position at which the medium facing surface 60 is to be formed.

The method of manufacturing the thermally-assisted magnetic recording head according to the present embodiment is the same as the method according to the first embodiment up to the step of polishing the cladding layer 18 (see FIG. 5 and FIG. 6). FIG. 20 shows the next step. In this step, first, an initial core 120P having a top surface 120Pa is formed on the cladding layer 18. The initial core 120P will later become the core 120. The initial core 120P is formed by, for example, first forming a dielectric layer over the entire top surface of the stack and then patterning the dielectric layer by etching a portion of the dielectric layer by RIE. Next, the second layers of the coupling portions 17A and 17B are formed on the first layers of the coupling portions 17A and 17B (see FIG. 5), respectively. Next, the cladding layer 19 (see FIG. 6) is formed over the entire top surface of the stack. The cladding layer 19 is then polished by, for example, CMP, until the top surface 120Pa of the initial core 120P and top surfaces of the second layers of the coupling portions 17A and 17B are exposed.

FIG. 21 shows the next step. In this step, first, an etching mask (not illustrated) is formed on the top surface of the stack. Either a photoresist mask or a hard mask is used as this etching mask. This etching mask does not cover a region of the top surface 120Pa of the initial core 120P where the second end face 122b of the protruding portion 122 is to be formed later and regions of the top surface 120Pa of the initial core 120P where the second and third regions R2 and R3 of the first surface 121b of the main body portion 121 are to be formed later. Using this etching mask, the top surface 120Pa of the initial core 120P is then partly etched by, for example, IBE, so that the second end face 122b and the second and third regions R2 and R3 of the first surface 121b are formed. The core 120 is thereby completed. As shown in FIG. 20 and FIG. 21, the main body portion 121 and the protruding portion 122 are integrally formed from the initial core 120P. In FIG. 21, the boundary between the main body portion 121 and the protruding portion 122 is indicated in a broken line. The non-illustrated etching mask is then removed. The subsequent steps are the same as those in the first embodiment.

As described above, the step of forming the core 120 in the method of manufacturing the near-field light generator according to the present embodiment includes the step of forming the initial core 120P having the top surface 120Pa, and the step of partly etching the top surface 120Pa of the initial core 120P so that the initial core 120P becomes the core 120. The remainder of configuration, function and effects of the present embodiment are similar to those of the first embodiment.

[Fourth Embodiment]

Figure 22:
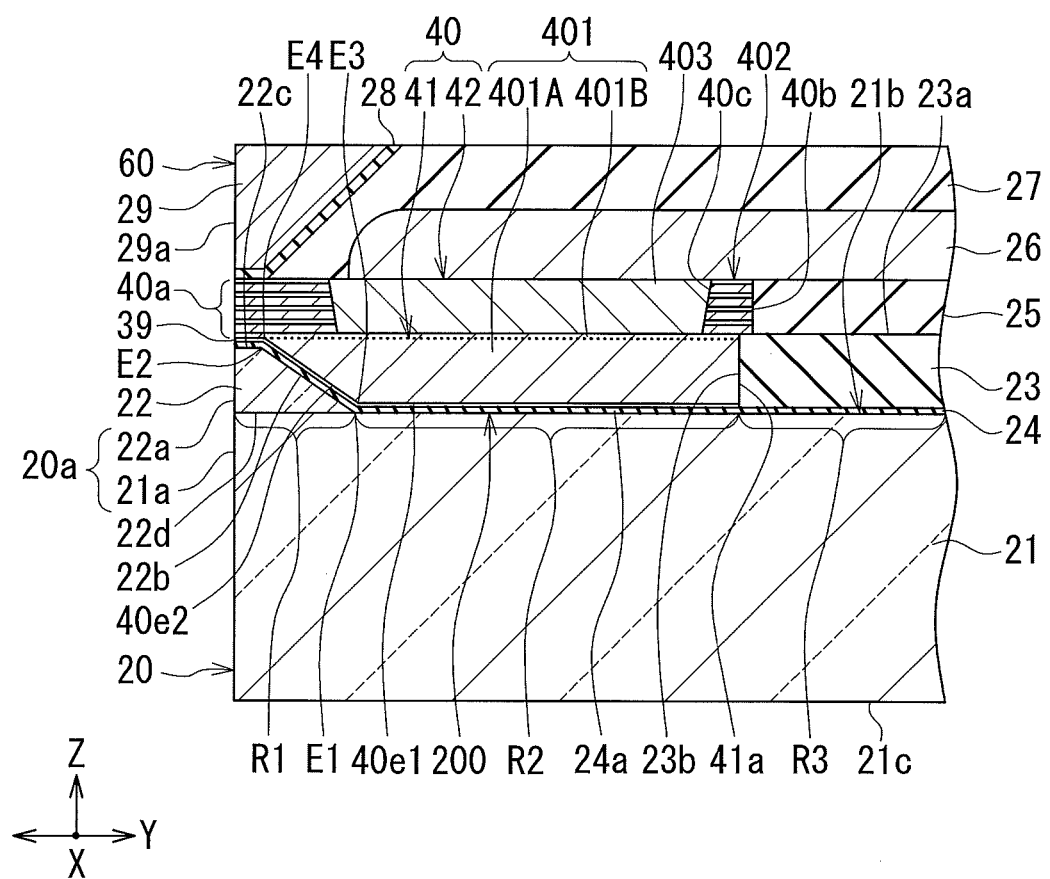
FIG. 22 is a cross-sectional view showing the main part of a thermally-assisted magnetic recording head according to a fourth embodiment of the invention.

A near-field light generator and a thermally-assisted magnetic recording head according to a fourth embodiment of the invention will now be described. First, reference is made to FIG. 22 to describe the configurations of the near-field light generator and the thermally-assisted magnetic recording head according to the present embodiment. FIG. 22 is a cross-sectional view showing the main part of the thermally-assisted magnetic recording head according to the present embodiment.

The near-field light generator and the thermally-assisted magnetic recording head according to the present embodiment differ from those according to the first embodiment in the following ways. In the present embodiment, the cladding layer 24 covers the second and third regions R2 and R3 of the first surface 21b of the main body portion 21 of the core 20 and the second end face 22b and the top surface 22c of the protruding portion 22 of the core 20. The receiving-portion-forming layer 23 is disposed over the third region R3 with the cladding layer 24 interposed between the third region R3 and the receiving-portion-forming layer 23. The top surface 23a of the receiving-portion-forming layer 23 is located at the same level as the top surface of the first metal portion 401 (the top surface of the bonding portion 401B) of the plasmon generator 40. The dielectric layer 25 lies on the receiving-portion-forming layer 23.

As described in the first embodiment section, the receiving-portion-forming layer 23 has five wall faces defining the periphery of the receiving portion 200. In FIG. 22, the symbol 23b represents one of the five wall faces of the receiving-portion-forming layer 23 that is located farther from the medium facing surface 60 than is the second region R2. In the present embodiment, this wall face 23b is perpendicular to the Y direction, or equivalently, parallel to the medium facing surface 60.

In FIG. 22, the symbol 41a represents one of the side surfaces of the first portion 41 of the plasmon generator 40, the one being located farther from the medium facing surface 60 than is the first plasmon exciting portion 40e1 of the first portion 41 (the bottom surface of the first portion 41) and contiguous with the first plasmon exciting portion 40e1. The side surface 41a is in contact with the wall face 23b. Like the wall face 23b, the side surface 41a is perpendicular to the Y direction, or equivalently, parallel to the medium facing surface 60.

The waveguide of the present embodiment may include the core 120 described in the third embodiment section, in place of the core 20.

Figure 23:
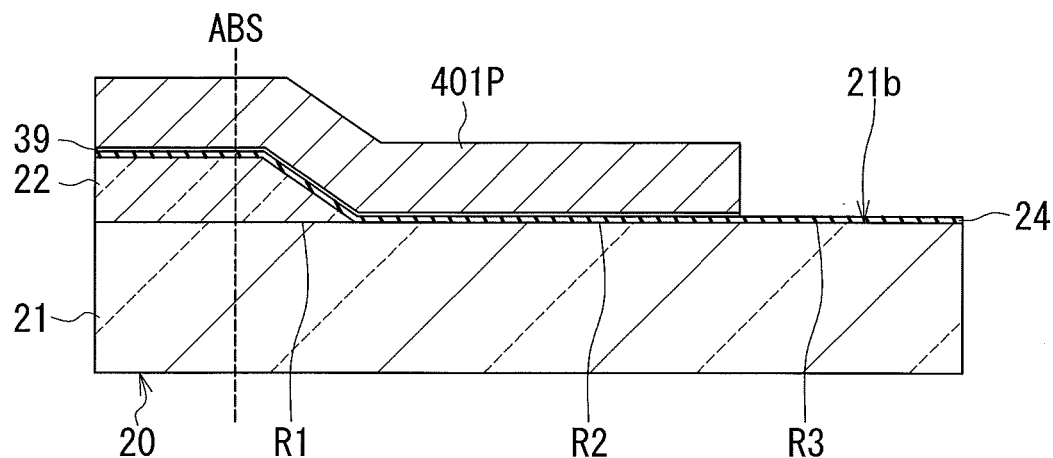
FIG. 23 is a cross-sectional view showing a step of a method of manufacturing the thermally-assisted magnetic recording head according to the fourth embodiment of the invention.
Figure 24:
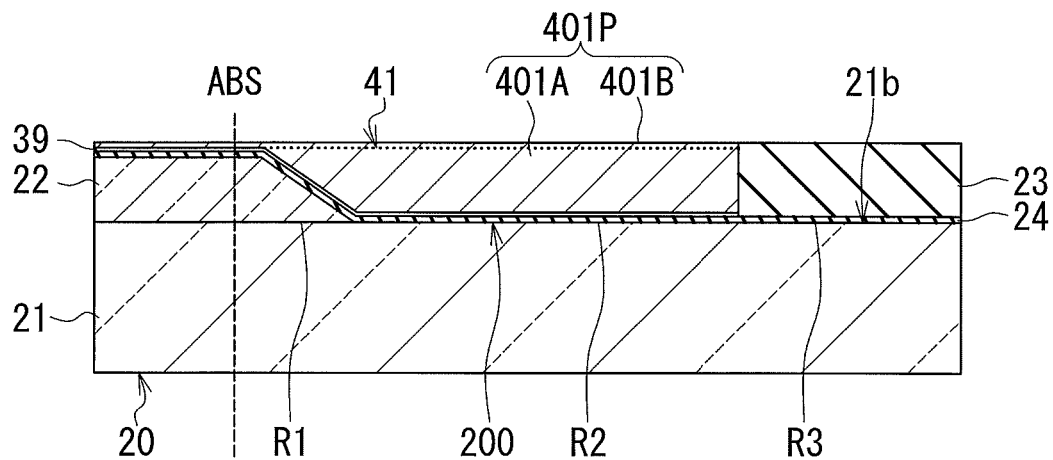
FIG. 24 is a cross-sectional view showing a step that follows the step shown in FIG. 23.
Figure 25:
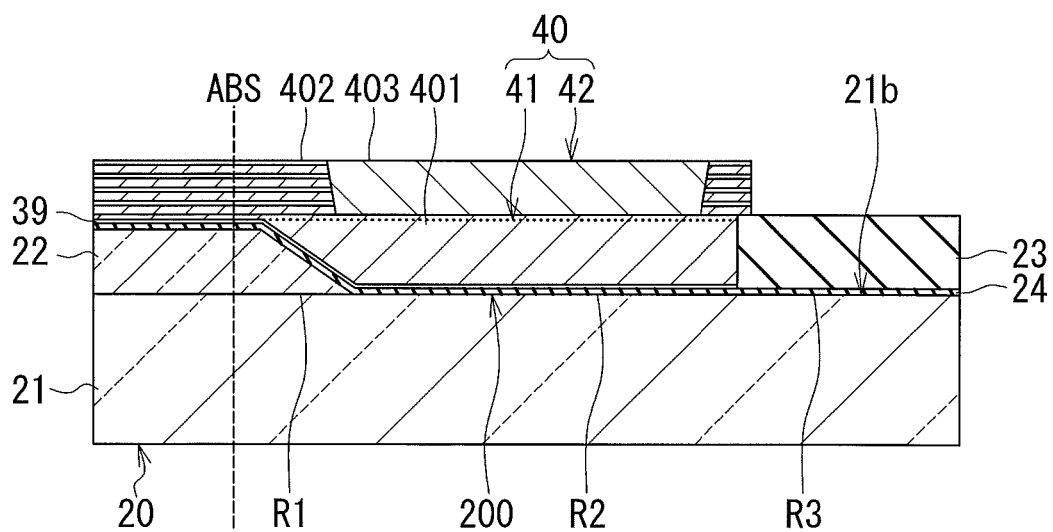
FIG. 25 is a cross-sectional view showing a step that follows the step shown in FIG. 24.

A method of manufacturing the thermally-assisted magnetic recording head according to the present embodiment will now be described with reference to FIG. 23 to FIG. 25. The following descriptions include the description of a method of manufacturing the near-field light generator according to the present embodiment. FIG. 23 to FIG. 25 each illustrate a stack of layers formed in the process of manufacturing the thermally-assisted magnetic recording head. FIG. 23 to FIG. 25 each show a cross section that intersects the end face 29a of the main pole 29 and that is perpendicular to the medium facing surface 60 and to the top surface 1a of the substrate 1 (see FIG. 5 and FIG. 6). In FIG. 23 to FIG. 25, the symbol "ABS" indicates the position at which the medium facing surface 60 is to be formed.

The method of manufacturing the thermally-assisted magnetic recording head according to the present embodiment is the same as the method according to the first or second embodiment up to the step of forming the core 20. FIG. 23 shows the next step. In this step, first, the cladding layer 24 and the adhesion layer 39 are formed in this order over the entire top surface of the stack. Then, a metal film 401P is formed on the adhesion layer 39 by sputtering, for example. The metal film 401P will later become the first metal portion 401 of the plasmon generator 40. The metal film 401P is formed such that the top surfaces of its portions lying on the second and third regions R2 and R3 are higher in level than the top surface of the first metal portion 401 to be formed later. Then, an etching mask (not illustrated) whose planar shape corresponds to the planar shape of the first metal portion 401 is formed on the metal film 401P. Next, portions of the adhesion layer 39 and the metal film 401P other than their portions lying under the non-illustrated etching mask are removed by RIE or IBE, for example. The non-illustrated etching mask is then removed.

FIG. 24 shows the next step. In this step, first, a dielectric layer of a dielectric material that is to form the receiving-portion-forming layer 23 is formed over the entire top surface of the stack. The metal layer 401P and the dielectric layer are then polished by, for example, CMP, to the level of the top surface of the first metal portion 401 (the top surface of the bonding portion 401B). The dielectric layer thereby becomes the receiving-portion-forming layer 23. Further, the metal portion 401P thereby becomes the first metal portion 401 to complete the first portion 41 of the plasmon generator 40 constituted of the main portion 401A of the first metal portion 401. In FIG. 24, the boundary between the main portion 401A (the first portion 41) and the bonding portion 401B of the first metal portion 401 is indicated in a dotted line.

FIG. 25 shows the next step. In this step, the multilayer film portion 402 and the second metal portion 403 are formed on the first metal portion 401 and the receiving-portion-forming layer 23. The multilayer film portion 402 and the second metal portion 403 are formed in the same manner as in the first embodiment. The second portion 42 of the plasmon generator 40 and the near-field light generator are thereby completed. In FIG. 25, the boundary between the first portion 41 and the second portion 42 of the plasmon generator 40 is indicated in a dotted line.

As described above, the step of forming the plasmon generator 40 in the method of manufacturing the near-field light generator according to the present embodiment includes the step of forming the first portion 41 and the step of forming the second portion 42. The step of forming the cladding includes the step of forming the receiving-portion-forming layer 23 that is performed simultaneously with the step of forming the first portion 41.

The remainder of configuration, function and effects of the present embodiment are similar to those of any of the first to third embodiments.

The present invention is not limited to the foregoing embodiments, and various modifications may be made thereto. For example, as far as the requirements of the appended claims are met, the shape of the plasmon generator 40 and the locations of the plasmon generator 40, the core 20 and the main pole 29 are not limited to the respective examples illustrated in the foregoing embodiments but can be chosen as desired. For example, the plasmon generator 40 may be formed by stacking the second portion 42 and the first portion 41 in this order from the bottom, and the core 20 may be disposed above the first portion 41. In such a case, the bottom surface of the main body portion 21 corresponds to the "first surface" of the present invention, and the top surface of the main body portion 21 corresponds to the "second surface"

of the present invention. The protruding portion 22 lies on the first region of the bottom surface of the main body portion 21; the receiving-portion-forming layer 23 lies on the third region of the bottom surface of the main body portion 21; the protruding portion 22 and the receiving-portion-forming layer 23 define therebetween a receiving portion; and at least part of the first portion 41 is received in this receiving portion.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generator comprising:
    a waveguide including a core through which light propagates, and a cladding provided around the core; and
    a plasmon generator, wherein
    the core has a first front end face lying at an end of the core in a first direction, the first direction being a direction of travel of the light propagating through the core,
    the plasmon generator has a second front end face lying at an end of the plasmon generator in the first direction,
    the core and the plasmon generator are adjacent in a second direction orthogonal to the first direction,
    the plasmon generator includes a first portion and a second portion adjacent in the second direction, the second portion including the second front end face,
    the core includes a main body portion and a protruding portion adjacent in the second direction,
    the main body portion has a first surface facing toward the plasmon generator, and a second surface opposite to the first surface, the first surface and the second surface being flat surfaces parallel to each other,
    the first surface includes a first region, a second region and a third region,
    the first region has an edge located in the first front end face,
    the second region is contiguous with the first region and is located farther from the first front end face than is the first region,
    the third region is a region of the first surface other than the first and second regions,
    the protruding portion lies on the first region, and has a first end face constituting part of the first front end face, and a second end face opposite to the first end face,
    the cladding includes a receiving-portion-forming layer lying on the third region,
    the protruding portion and the receiving-portion-forming layer define therebetween a receiving portion,
    at least part of the first portion of the plasmon generator is received in the receiving portion,
    the first portion of the plasmon generator includes a first plasmon exciting portion opposed to the second region, and a second plasmon exciting portion opposed to the second end face of the protruding portion,
    the second region generates first evanescent light based on the light propagating through the core,
    the second end face of the protruding portion generates second evanescent light based on the light propagating through the core,
    the plasmon generator is configured so that a first surface plasmon is excited on the first plasmon exciting portion through coupling with the first evanescent light, and a second surface plasmon is excited on the second plasmon exciting portion through coupling with the second evanescent light, and
    the second front end face of the plasmon generator generates near-field light based on the first and second surface plasmons.

2. The near-field light generator according to claim 1, wherein
    the second end face of the protruding portion has a first edge in contact with the first surface of the main body portion, and a second edge farthest from the first surface, the second edge being located closer to the first front end face of the core than is the first edge, and
    the second plasmon exciting portion has a third edge in contact with the first plasmon exciting portion, and a fourth edge in contact with the second portion of the plasmon generator, the fourth edge being located closer to the first front end face of the core than is the third edge.

3. The near-field light generator according to claim 1, wherein
    the second portion of the plasmon generator includes a first metal layer, a second metal layer, and an intermediate layer,
    the intermediate layer is interposed between the first metal layer and the second metal layer,
    each of the first metal layer, the second metal layer and the intermediate layer has an end located in the second front end face,
    each of the first and second metal layers is formed of a metal material, and
    the intermediate layer is formed of a material that is higher in Vickers hardness than the metal material used to form the first metal layer and the metal material used to form the second metal layer.

4. A method of manufacturing the near-field light generator according to claim 1, comprising the steps of:
    forming the core;
    forming the cladding; and
    forming the plasmon generator after the step of forming the core.

5. The method of manufacturing the near-field light generator according to claim 4, wherein the step of forming the core includes the step of forming the main body portion and the step of forming the protruding portion on the first region of the first surface of the main body portion.

6. The method of manufacturing the near-field light generator according to claim 5, wherein
    the second end face of the protruding portion has a first edge in contact with the first surface of the main body portion, and a second edge farthest from the first surface, the second edge being located closer to the first front end face of the core than is the first edge, and
    the second plasmon exciting portion has a third edge in contact with the first plasmon exciting portion, and a fourth edge in contact with the second portion of the plasmon generator, the fourth edge being located closer to the first front end face of the core than is the third edge.

7. The method of manufacturing the near-field light generator according to claim 6, wherein the step of forming the protruding portion includes the step of forming an initial protruding portion on the first region of the first surface of the main body portion, and the step of taper-etching the initial protruding portion so that the initial protruding portion is provided with the second end face and thereby becomes the protruding portion.

8. The method of manufacturing the near-field light generator according to claim 4, wherein the step of forming the core includes the step of forming an initial core having a top surface, and the step of partly etching the top surface of the initial core so that the initial core becomes the core.

9. The method of manufacturing the near-field light generator according to claim 8, wherein
the second end face of the protruding portion has a first edge in contact with the first surface of the main body portion, and a second edge farthest from the first surface, the second edge being located closer to the first front end face of the core than is the first edge, and
the second plasmon exciting portion has a third edge in contact with the first plasmon exciting portion, and a fourth edge in contact with the second portion of the plasmon generator, the fourth edge being located closer to the first front end face of the core than is the third edge.

10. The method of manufacturing the near-field light generator according to claim 4, wherein the step of forming the cladding includes the step of forming the receiving-portion-forming layer before the step of forming the plasmon generator.

11. The method of manufacturing the near-field light generator according to claim 4, wherein
the step of forming the plasmon generator includes the step of forming the first portion and the step of forming the second portion, and
the step of forming the cladding includes the step of forming the receiving-portion-forming layer that is performed simultaneously with the step of forming the first portion.

12. A thermally-assisted magnetic recording head comprising:
a medium facing surface configured to face a recording medium;
a main pole configured to produce a write magnetic field for writing data on the recording medium; and
a near-field light generator, wherein
the near-field light generator includes:
a waveguide including a core through which light propagates, and a cladding provided around the core; and
a plasmon generator,
the core has a first front end face lying at an end of the core in a first direction, the first direction being a direction of travel of the light propagating through the core,
the plasmon generator has a second front end face lying at an end of the plasmon generator in the first direction, the second front end face being located in the medium facing surface,
the core and the plasmon generator are adjacent in a second direction orthogonal to the first direction,
the plasmon generator includes a first portion and a second portion adjacent in the second direction, the second portion including the second front end face,
the core includes a main body portion and a protruding portion adjacent in the second direction,
the main body portion has a first surface facing toward the plasmon generator, and a second surface opposite to the first surface, the first surface and the second surface being flat surfaces parallel to each other,
the first surface includes a first region, a second region and a third region,
the first region has an edge located in the first front end face,
the second region is contiguous with the first region and is located farther from the first front end face than is the first region,
the third region is a region of the first surface other than the first and second regions,
the protruding portion lies on the first region, and has a first end face constituting part of the first front end face, and a second end face opposite to the first end face,
the cladding includes a receiving-portion-forming layer lying on the third region,
the protruding portion and the receiving-portion-forming layer define therebetween a receiving portion,
at least part of the first portion of the plasmon generator is received in the receiving portion,
the first portion of the plasmon generator includes a first plasmon exciting portion opposed to the second region, and a second plasmon exciting portion opposed to the second end face of the protruding portion,
the second region generates first evanescent light based on the light propagating through the core,
the second end face of the protruding portion generates second evanescent light based on the light propagating through the core,
the plasmon generator is configured so that a first surface plasmon is excited on the first plasmon exciting portion through coupling with the first evanescent light, and a second surface plasmon is excited on the second plasmon exciting portion through coupling with the second evanescent light, and
the second front end face of the plasmon generator generates near-field light based on the first and second surface plasmons.

13. The thermally-assisted magnetic recording head according to claim 12, wherein
the second end face of the protruding portion has a first edge in contact with the first surface of the main body portion, and a second edge farthest from the first surface, the second edge being located closer to the first front end face of the core than is the first edge, and
the second plasmon exciting portion has a third edge in contact with the first plasmon exciting portion, and a fourth edge in contact with the second portion of the plasmon generator, the fourth edge being located closer to the first front end face of the core than is the third edge.

14. The thermally-assisted magnetic recording head according to claim 12, wherein
the second portion of the plasmon generator includes a first metal layer, a second metal layer, and an intermediate layer,
the intermediate layer is interposed between the first metal layer and the second metal layer,
each of the first metal layer, the second metal layer and the intermediate layer has an end located in the second front end face,
each of the first and second metal layers is formed of a metal material, and
the intermediate layer is formed of a material that is higher in Vickers hardness than the metal material used to form the first metal layer and the metal material used to form the second metal layer.

* * * * *